United States Patent
Mizuno

(10) Patent No.: US 8,363,284 B2
(45) Date of Patent: Jan. 29, 2013

(54) IMAGE PROCESSING SYSTEM FOR PRODUCING COPY PROTECTED IMAGES USING TRANSPARENT RECORDING MATERIAL

(75) Inventor: Yoshitake Mizuno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 890 days.

(21) Appl. No.: 12/249,755

(22) Filed: Oct. 10, 2008

(65) Prior Publication Data

US 2009/0097063 A1 Apr. 16, 2009

(30) Foreign Application Priority Data

Oct. 11, 2007 (JP) ................. 2007-265576

(51) Int. Cl.
*H04N 1/40* (2006.01)
(52) U.S. Cl. ............. 358/3.28; 358/1.14; 358/1.15; 399/366; 283/72; 283/94; 283/902; 380/51; 380/54; 380/55
(58) Field of Classification Search ............ 399/366; 283/72, 94, 902; 380/51, 54, 55; 358/3.28, 358/1.14, 1.15
See application file for complete search history.

(56) References Cited

U.S. PATENT DOCUMENTS

| | | | |
|---|---|---|---|
| 6,271,930 B1 | 8/2001 | Yamazaki | |
| 6,985,242 B1 * | 1/2006 | Toyoda | 358/1.15 |
| 7,491,424 B2 * | 2/2009 | Hersch et al. | 427/267 |
| 7,808,665 B2 * | 10/2010 | Aoyama et al. | 358/1.15 |
| 7,976,068 B2 * | 7/2011 | Wicker et al. | 283/72 |
| 2004/0184099 A1 * | 9/2004 | Silverbrook et al. | 358/1.15 |
| 2005/0024672 A1 | 2/2005 | Guster et al. | |
| 2005/0078993 A1 * | 4/2005 | Oomura et al. | 399/366 |
| 2005/0135856 A1 * | 6/2005 | Uchida et al. | 399/411 |
| 2006/0001903 A1 * | 1/2006 | Ikuno | 358/1.15 |
| 2006/0256369 A1 | 11/2006 | Mitamura | |
| 2007/0052980 A1 * | 3/2007 | Lee | 358/1.1 |
| 2007/0147929 A1 * | 6/2007 | Ishimoto et al. | 400/62 |
| 2008/0151288 A1 * | 6/2008 | Matsunoshita | 358/1.15 |

FOREIGN PATENT DOCUMENTS

| | | |
|---|---|---|
| EP | 1209897 A2 | 5/2004 |
| EP | 1418747 A1 | 5/2004 |
| EP | 1777933 A1 | 4/2007 |
| JP | 08-317176 A | 11/1996 |
| JP | 09-037094 A | 2/1997 |
| JP | 10-055085 A | 2/1998 |
| JP | 2001-111813 A | 4/2001 |
| JP | 2003-118276 A | 4/2003 |
| JP | 2006-093920 A | 4/2006 |
| JP | 2006-108922 A | 4/2006 |
| JP | 2006-252231 A | 9/2006 |
| JP | 2006-253846 A | 9/2006 |
| JP | 2006-263938 A | 10/2006 |
| JP | 2007-025112 A | 2/2007 |
| JP | 2007-049480 A | 2/2007 |
| JP | 2007-127790 A | 5/2007 |
| JP | 2007-251400 A | 9/2007 |
| JP | 2007-258930 A | 10/2007 |

* cited by examiner

*Primary Examiner* — Benjamin O Dulaney

(74) *Attorney, Agent, or Firm* — Canon USA, Inc., IP Division

(57) ABSTRACT

An information processing apparatus according to an aspect of the present invention includes an identifying unit configured to identify a printing capability of an apparatus that is a transmission destination of first image data, and a converting unit configured to convert the first image data, which has been instructed to be printed with a transparent recording material, into second image data that can be printed by the transmission destination apparatus, on the basis of the identification result of the identifying unit and information attached to the first image data.

9 Claims, 18 Drawing Sheets

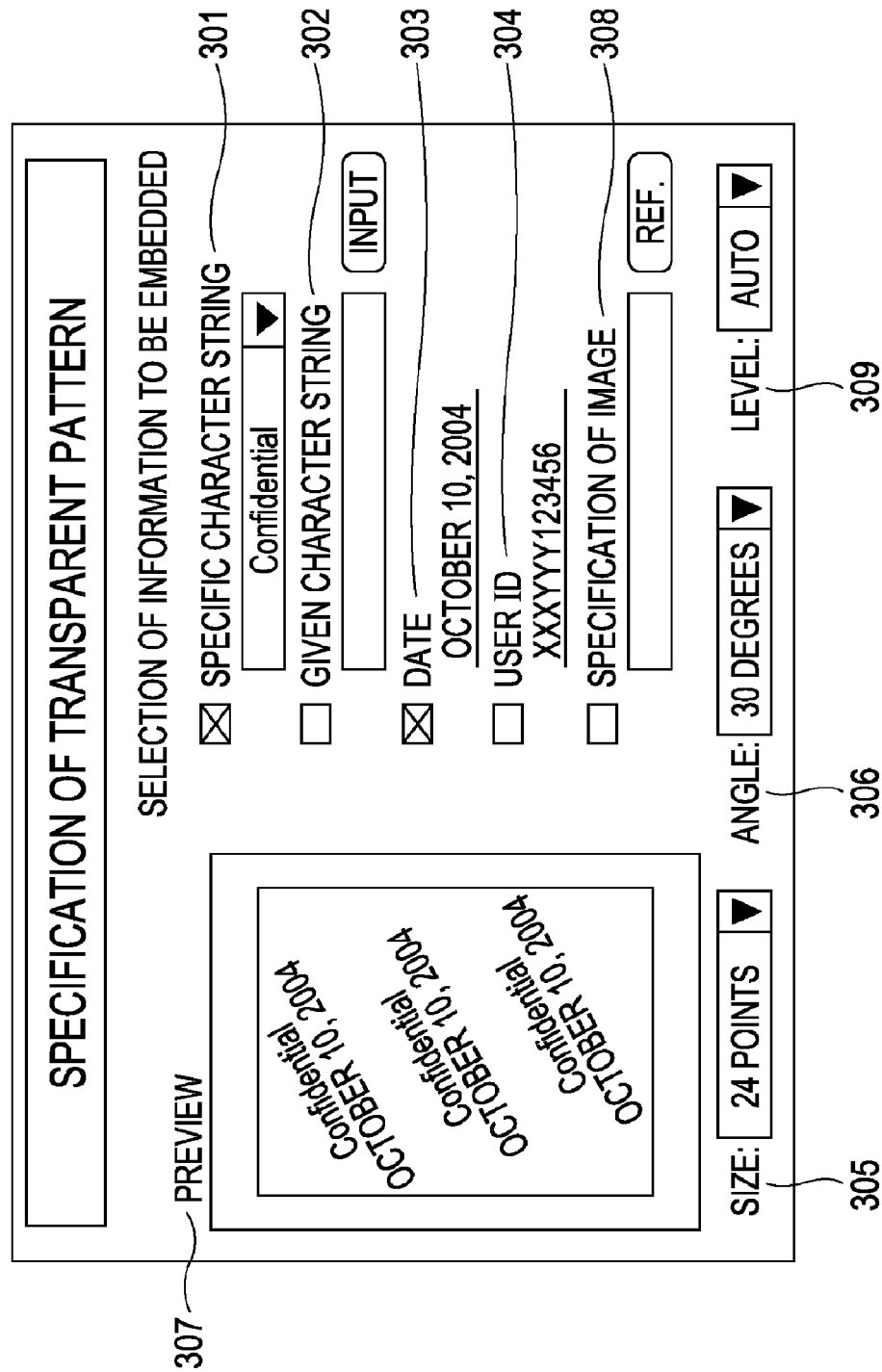

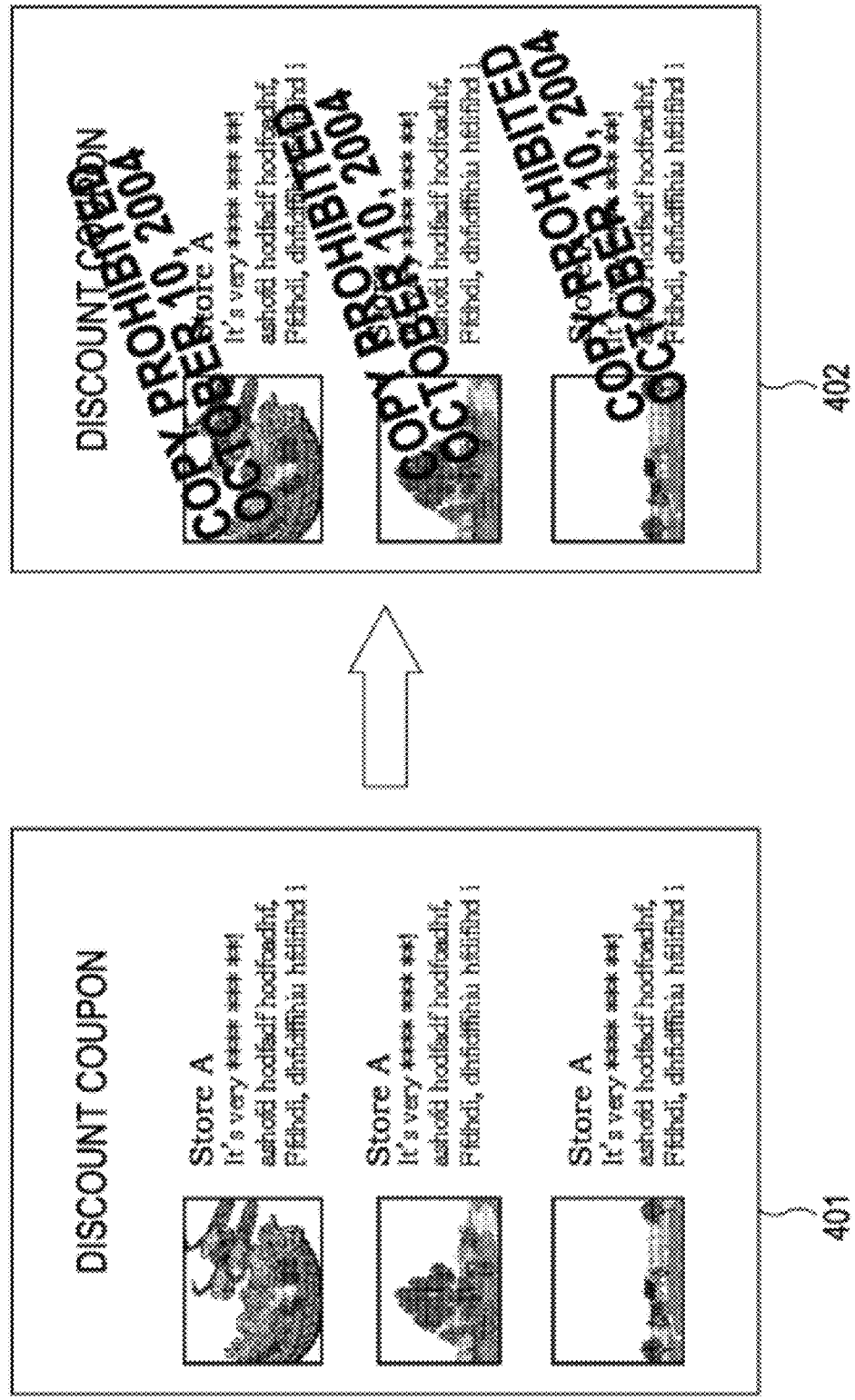

FIG. 5

| TRANSPARENT IMAGE INFORMATION | | | | |
|---|---|---|---|---|
| TRANSPARENT PRINTING | | | | SELECTED OR NOT SELECTED — 501 |
| | WHOLE SURFACE | | | WHOLE SURFACE PRINTING IS SELECTED OR NOT SELECTED — 502 |
| | PARTIAL | SUPERIMPOSITION | | SUPERIMPOSITION ON ORIGINAL IMAGE IS SELECTED OR NOT SELECTED — 503 |
| | | CHARACTER STRING PRINTING | | SELECTED OR NOT — 504 |
| | | CHARACTER STRING | | "Confidential" — 505 |
| | | SIZE | | "24 POINTS" — 506 |
| | | FONT | | "CENTURY" — 507 |
| | | ANGLE | | 30 DEGREES — 508 |
| | | IMAGE | | SPECIFIED OR NOT SPECIFIED — 509 |
| | | IMAGE ID | | "20070625001" — 510 |
| | | IMAGE AREA INFORMATION | | 6TH BIT — 511 |
| | | ORIGINAL GUARANTEE LEVEL | | 0: ADDITION OF TRANSPARENT IMAGE, FINE DOT (COPY-FORGERY-INHIBITED PATTERN) PRINTING, STAMP PRINTING, OR COMBINATION-FREE PRINTING IS PERMITTED<br>1: ADDITION OF TRANSPARENT IMAGE, FINE DOT (COPY-FORGERY-INHIBITED PATTERN) PRINTING, OR STAMP PRINTING IS PERMITTED<br>2: ADDITION OF TRANSPARENT IMAGE OR FINE DOT (COPY-FORGERY-INHIBITED PATTERN) PRINTING IS PERMITTED<br>3: PRINTING OTHER THAN ADDITION OF TRANSPARENT IMAGE IS NOT PERMITTED<br>4: AUTOMATICALLY DETERMINED — 512, 513 |

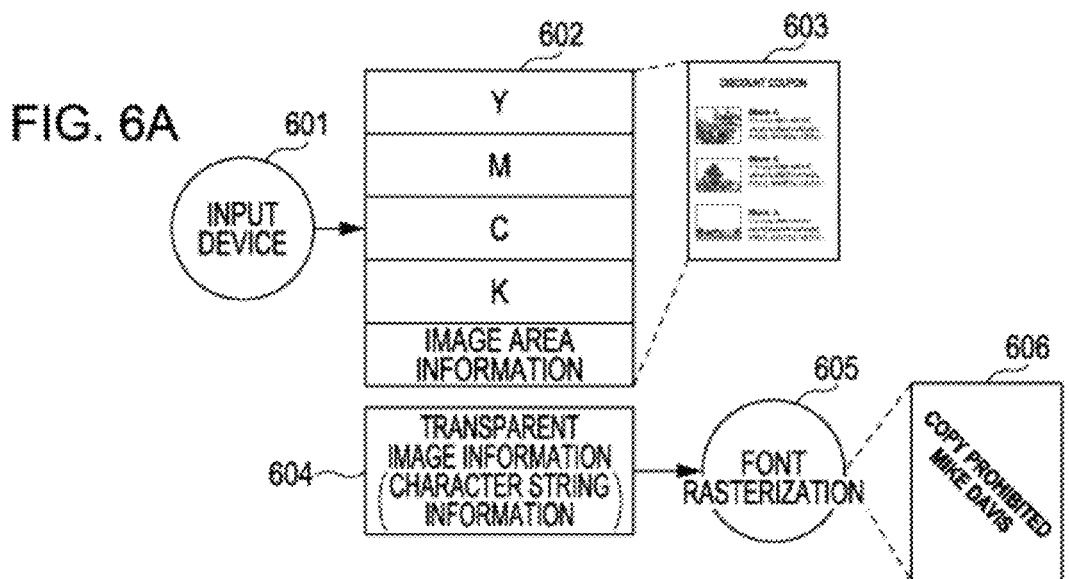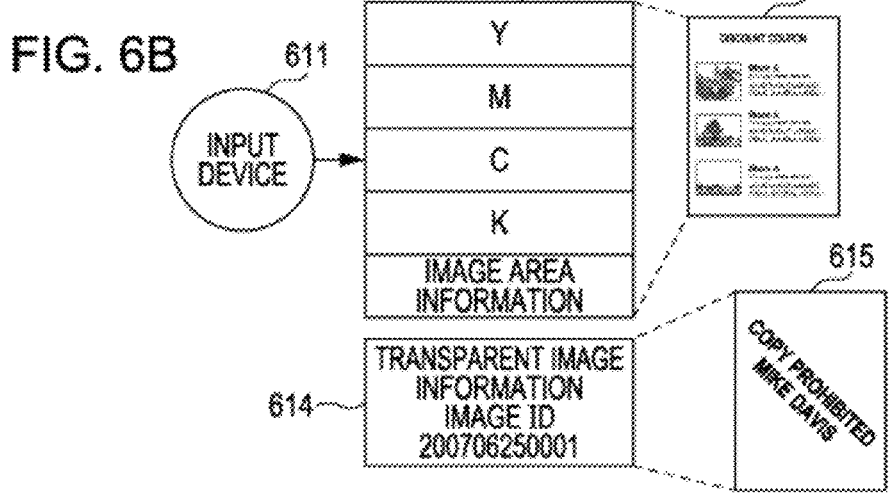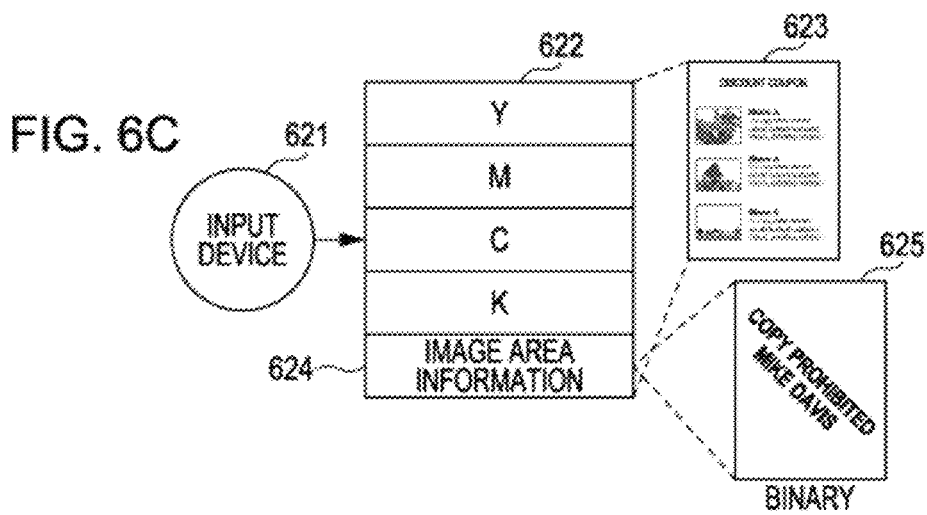

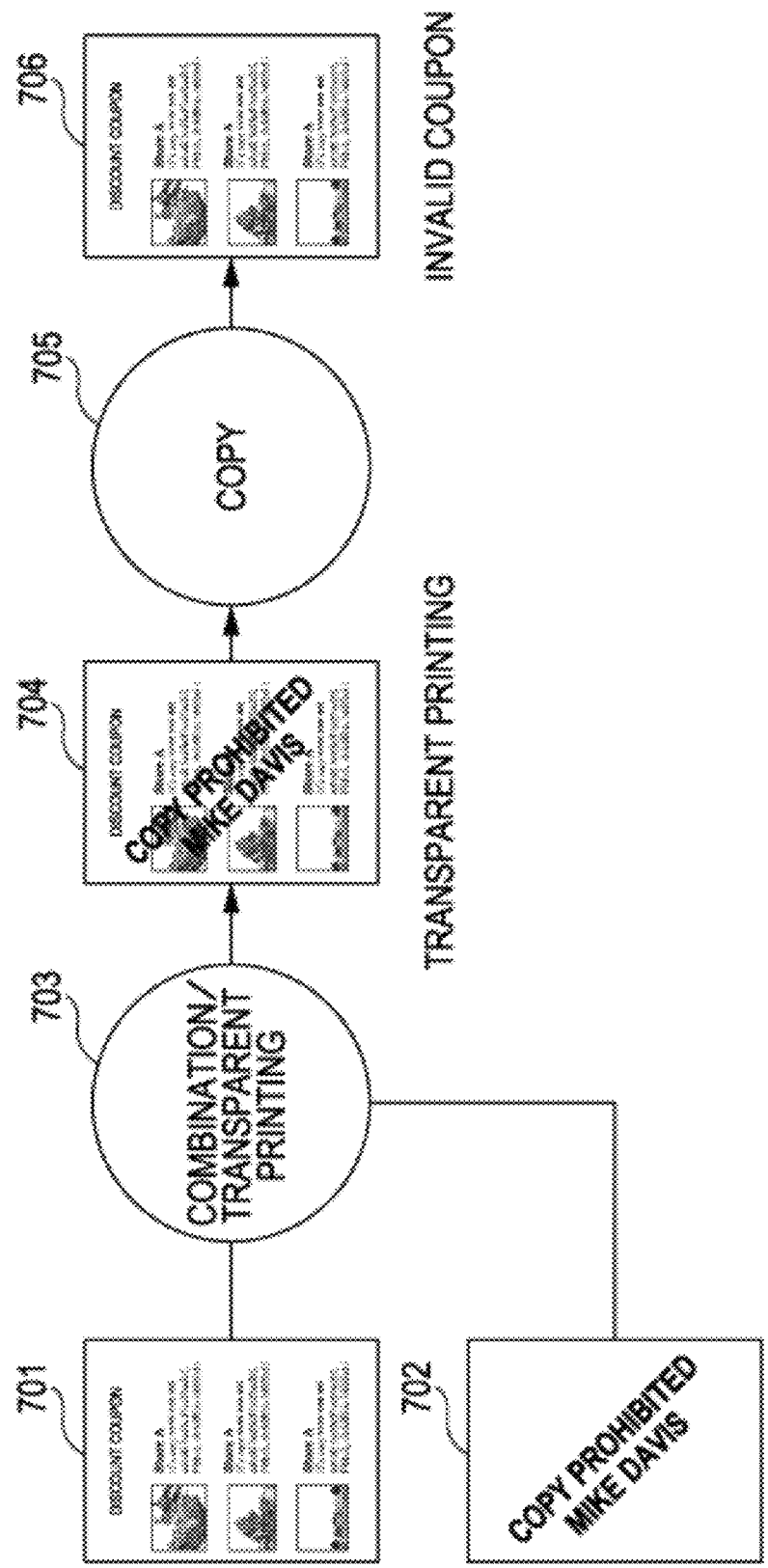

IMAGE PROCESSING SYSTEM FOR PRODUCING COPY PROTECTED IMAGES USING TRANSPARENT RECORDING MATERIAL

BACKGROUND OF THE INVENTION

1. Field of the Invention

The present invention relates to an image processing system and an image processing method for digitally generating and controlling image data of an image to be formed on a sheet with an image forming apparatus.

2. Description of the Related Art

Recently, digital printing technologies have been increasing the utility value thereof in on-demand printing markets and document printing markets requiring a small number of documents.

Regarding full-color printing using an electrophotographic technology, not only full-color electrophotographic printing using toner of four colors (cyan, magenta, yellow, and black (CMYK)) but also multicolor printing using special toners are receiving attention.

One of these special toners is a transparent toner, which is a transparent recording material that does not have pigment, but does have a characteristic of adding a colorless transparent image.

By superimposing this transparent toner on an image, glossiness of the image can be controlled (see Japanese Patent Laid-Open No. 10-055085).

In addition, since a colorless transparent image can be added with a transparent toner, additional information can be added to an image while suppressing degradation of the image quality.

In this case, there is a usage example of a transparent toner that an image is formed with a transparent toner on a sheet having been subjected to electrophotographic printing to print information certifying that the printed result is the original.

The information printed with a transparent toner, which is usually invisible, becomes visible by irradiating the information with ultraviolet light, and it is possible to certify that the printed material is not duplicated by forgery or copying (see Japanese Patent Laid-Open No. 2003-118276).

Additionally, Japanese Patent Laid-Open No. 2007-127790 discloses an add-on function for adding an identification number of an apparatus that has printed a printed material to an image. By executing this add-on function using a transparent toner instead of a yellow toner, information can be added to an image while preventing image degradation.

Since a transparent image portion formed using a transparent toner has glossiness different from that of a sheet, this transparent image portion can be discriminated with human eyes.

However, since a printed material containing such a transparent image portion does not have colors that can be discriminated with a scanning ability of a scanner, the scanner may not be able to scan the transparent image portion.

The original is guaranteed by using such a characteristic.

For example, when a character string or a mark that specifies a distribution destination is added to a document, the original of this document can be discriminated with human eyes based on a difference in glossiness of the transparent-toner-applied portion. Thus, the document can be recognized as the original.

However, when this document is copied with a copier, the transparent-toner-applied portion vanishes in the copy. Thus, the copy can be discriminated from the original.

In this original guarantee method using a transparent toner, printing can be advantageously performed without degrading the color, tone, and resolution of an original image although uniform glossiness of the original image is lost.

A transparent toner may be used on the whole surface of a sheet to produce uniform glossiness in addition to a case where the transparent toner is used partially as in the above-described guarantee of the original and in a case of expressing the glossiness.

When a transparent toner is used to express the uniform glossiness on the whole surface of a sheet, the transparent toner is used at an imageless portion in addition to an image-containing portion. Thus, the transparent toner is used up more rapidly than the other toners.

If the transparent toner is used up at the time of performing transparent printing using the transparent toner for the original guarantee, the original guarantee printing has to be paused until the transparent toner is replenished.

In addition, if a printer capable of performing transparent printing cannot carry out the transparent printing for some reason and data is transferred to, for example, a printer not having a function for performing transparent printing with a transparent toner, the original guarantee cannot be realized.

Accordingly, the printing has to be paused until a printer having a transparent printing function is ready for printing.

A document including a transparent printing setting as well as an image will now be discussed.

A creator of this document configures the transparent printing setting to form an image while superimposing a transparent toner on the image when this document is printed.

However, if this document is printed by a printer not having the transparent printing function, an image that should be printed with a transparent toner is not printed and useless printing not intended by a user having created this document is undesirably performed.

SUMMARY OF THE INVENTION

The present invention provides an original guarantee method for performing printing that yields, without using a transparent toner, a printed material having a characteristic similar to a printed material printed using a transparent toner when an apparatus for outputting image data does not have a transparent printing function.

According to an aspect of the present invention, an information processing apparatus includes an identifying unit configured to identify a printing capability of an apparatus that is a transmission destination of first image data, and a converting unit configured to convert the first image data, which has been instructed to be printed with a transparent recording material, into second image data that can be printed by the transmission destination apparatus, on the basis of the identification result of the identifying unit and information attached to the first image data.

According to the aspect of the present invention, when an apparatus for outputting image data does not have a transparent printing function, a printed material having a characteristic similar to a printed material printed using a transparent toner can be obtained without using the transparent toner.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

FIG. 3 shows a user interface of a transparent toner pattern specifying unit 105.

FIG. 4 shows an example of an output image.

FIG. 5 shows transparent image information.

FIG. 6A shows an example where image data 602 including a CMYK four-plane image and image area information is input from an input device 601, FIG. 6B shows a document in which an image data is registered as a transparent image, and FIG. 6C shows a document registered by an external host computer with a transparent image being previously included in image data.

FIG. 7 shows a method for obtaining a printed material of an original image to which a transparent image is added using transparent image data.

DESCRIPTION OF THE EMBODIMENTS

[Overview of System]

Figure 16:
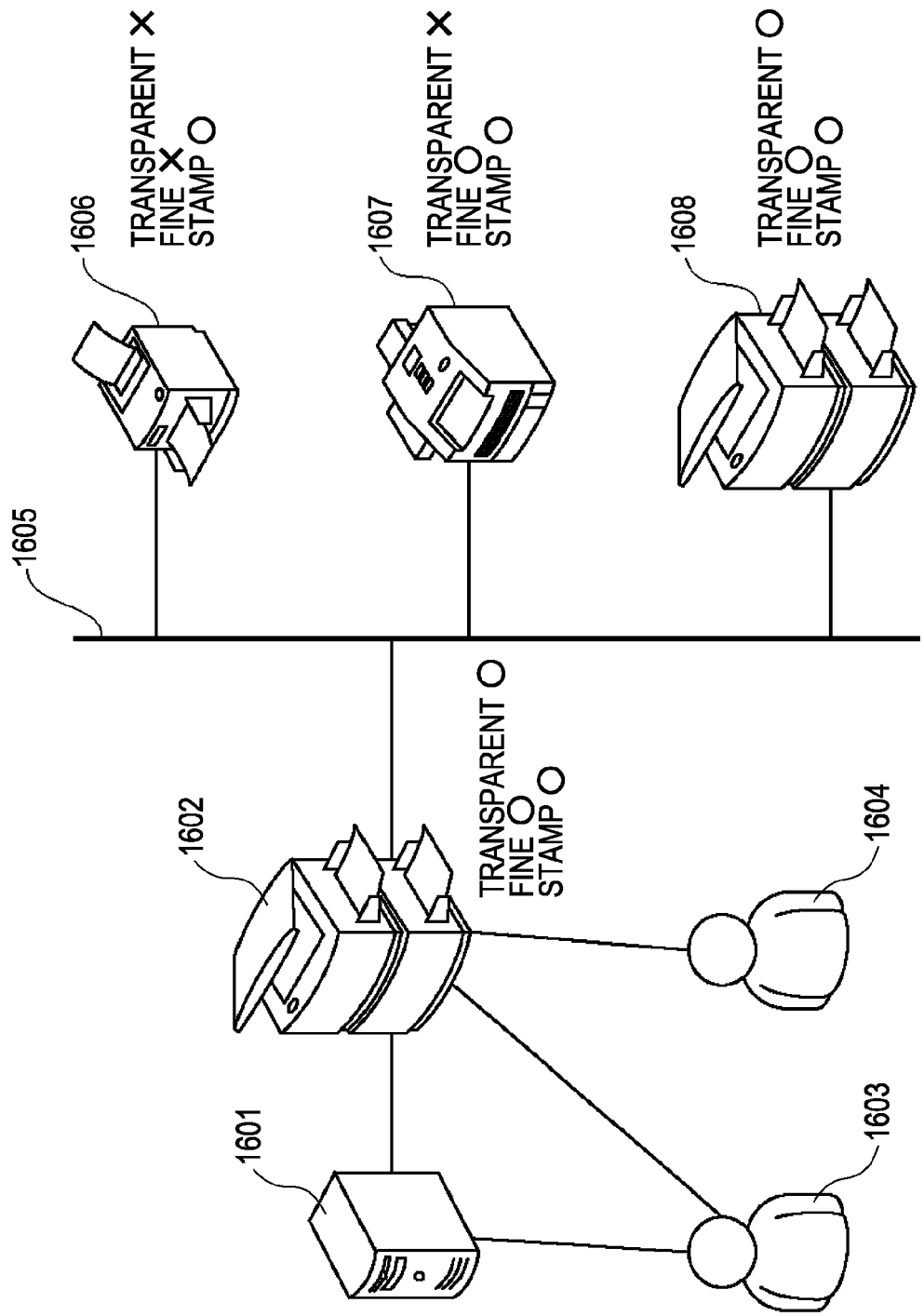
FIG. 16 is a configuration diagram illustrating an entire system to which exemplary embodiments of the present invention are applied.

FIG. 16 shows a configuration diagram that illustrates an entire system embodying the present invention. To perform a printing operation for adding transparent image data or to register original image data, a user 1603 registers the original image data in a target multifunction device 1602 or an external controller 1601 connected thereto. At that time, the user 1603 registers another image data as transparent image information or inputs information, such as a character string, to be added as a transparent image, and an original guarantee level to be described below.

The original image data is registered in the external controller 1601 using a printer driver installed in a host computer (not shown). Additionally, when an original image is registered in the multifunction device 1602, the registration is performed using an accompanying scanner.

Details of the registration will be described with reference to FIGS. 5 to 6C later.

In an exemplary embodiment, the user 1603 may perform both of the registration and printing operations or the user 1603 may perform the registration and storage operation and another user 1604 may print the registered and stored original image data and transparent image data.

At this time, the printing operation is performed in the multifunction device 1602 or one of printers 1606 to 1608 connected via a network 1605.

The printer 1606 connected via the network 1605 cannot perform transparent image printing and fine dot printing but can perform stamp printing.

The printer 1607 is a multifunction device incapable of performing transparent image printing but capable of performing fine dot printing and stamp printing.

The printers 1608 and 1602 are multifunction devices capable of performing transparent image printing, fine dot printing, and stamp printing.

[Flow of Image Processing]

Figure 1:
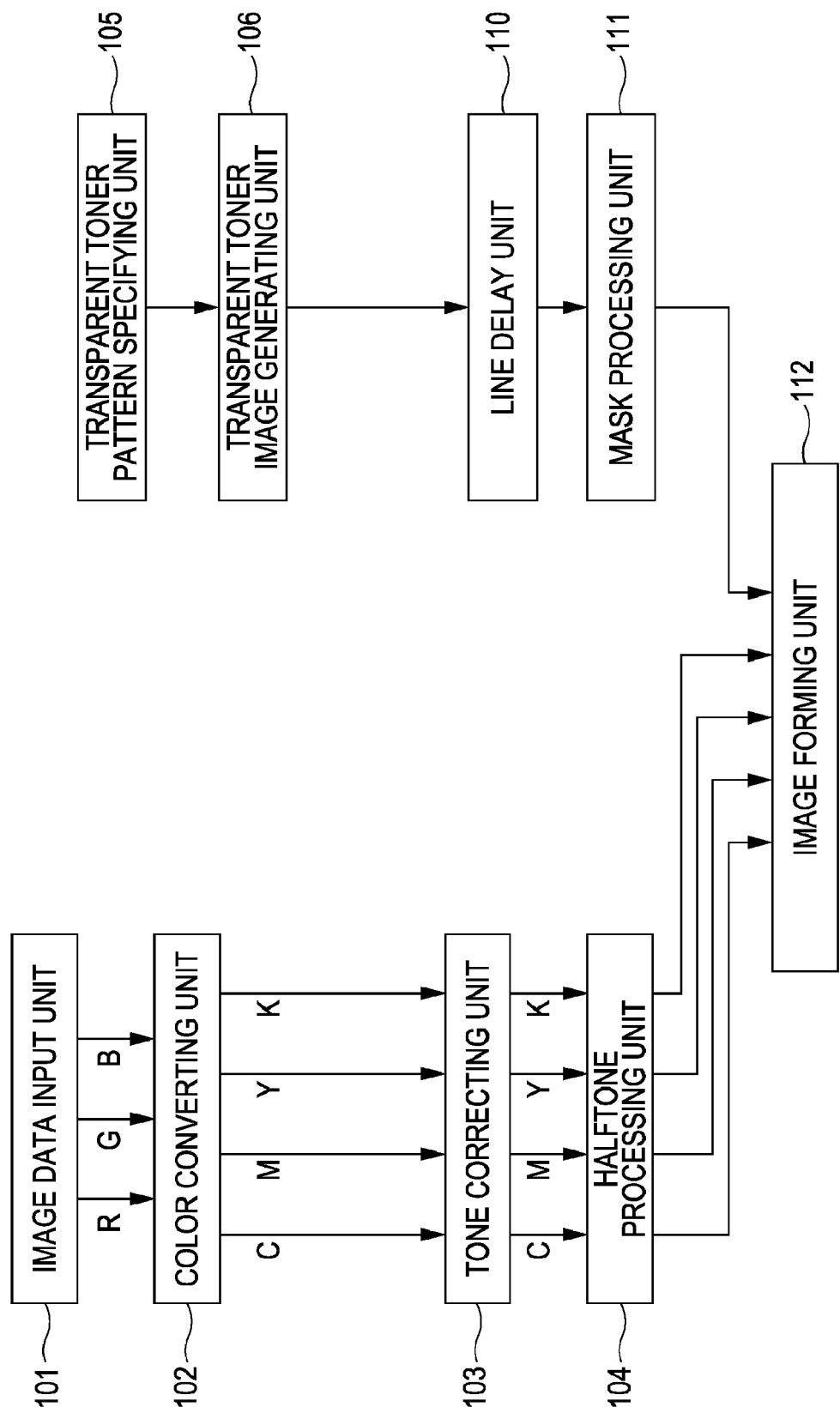
FIG. 1 shows a flow of image processing according to an exemplary embodiment of the present invention.

FIG. 1 shows a flow of image processing according to an exemplary embodiment of the present invention.

In this exemplary embodiment, an image data input unit 101 temporarily stores each page of an image scanned in units of pixels by an image scanner, and outputs image data of the image to a color converting unit 102.

The color converting unit 102 converts, for each pixel, image values in a color space of the image scanner, namely, R, G, and B, into values in a color space of printing, namely, cyan, magenta, yellow, and black (CMYK).

A tone correcting unit 103 performs tone correction on the created CMYK signals to obtain a proper tone characteristic. A halftone processing unit 104 performs pseudo-halftoning, such as so-called dithering, to form an image.

A transparent toner pattern specifying unit 105 allows a user to specify an output pattern of a transparent toner (transparent recording material) through a user interface (shown in FIG. 3).

Here, it is assumed that an original guaranteeing pattern created using a transparent toner is superimposed and printed on an original image.

A user selects desired data from some options, such as, for example, printing of a character string "classified" or "confidential", and printing of a print date and information of an image registering user, as a pattern created using a transparent toner.

Alternatively, the user can specify the pattern for guaranteeing the originality using a transparent toner by directly specifying a character string to be printed with a keyboard or by combining a separately registered pattern.

FIG. 3 shows an example of a displayed screen of a user interface employed in this case.

The user interface shown in FIG. 3 is displayed on a touch panel liquid crystal operation unit of an apparatus according to an exemplary embodiment, a remote operation screen connected via a network or the like, or a printer driver screen. The user specifies the transparent toner pattern using this user interface.

Settable items 301 to 306, 308, and 309 are displayed. Regarding the items 301 to 304, "whether to output or not" is set with checkboxes "☐".

FIG. 3 shows that the output of the items 301 and 303 is "set".

The item 301 is used to output a predetermined character string. The user can select a desired character string from those shown in a pull-down menu, such as "confidential", "classified", and "copy prohibited".

The item 302 allows the user to specify a given character string. In response to pressing of an input button arranged at the right end, a soft keyboard is displayed and the user can input a given character string. The character string input by the user is then displayed in a text box.

The item 303 is an operation portion for instructing output of a date when the apparatus is operated by the user. The date is automatically displayed based on a clock included in the apparatus.

The item 304 is an operation portion for instructing output of a user ID of a user who is using this user interface to register a transparent pattern image. In response to login of the user, the user ID is automatically displayed.

The items 305 and 306 allow the user to specify an output format of a transparent pattern. Here, size and angle of a character string are specified through a pull-down menu.

The item 308 allows the user to specify an image to be combined. In response to pressing of a reference button arranged at the right end, a list of registered images or a file tree is displayed to allow the user to specify a given image. The name of the image selected by the user is then displayed.

The user can preview a result to be actually output on a sheet according to the set items on a preview screen 307 arranged on the left.

In addition, the user can specify a combination method by selecting the item 309. FIG. 3 shows a screen in which an automatic determination mode is selected. Details regarding a level of the combination method will be described later.

These are the details of the operation of the transparent toner pattern specifying unit 105 shown in FIG. 1.

Transparent image information specified in this manner is sent to a transparent toner image generating unit 106.

The transparent toner image generating unit 106 generates an image pattern to be formed with a transparent toner in a bitmap format according to the specified information. At this time, the bitmap-format image pattern is generated for each pixel.

An image signal of an image formed with the transparent toner is sent to an image forming unit 112 through a predetermined line delay unit 110 along with four-color image signals of C, M, Y, and K.

A full-color image of C, M, Y, and K and a transparent image are ultimately combined and printed on a sheet, whereby a final output image is obtained.

[Configuration of Entire Apparatus]

Figure 2:
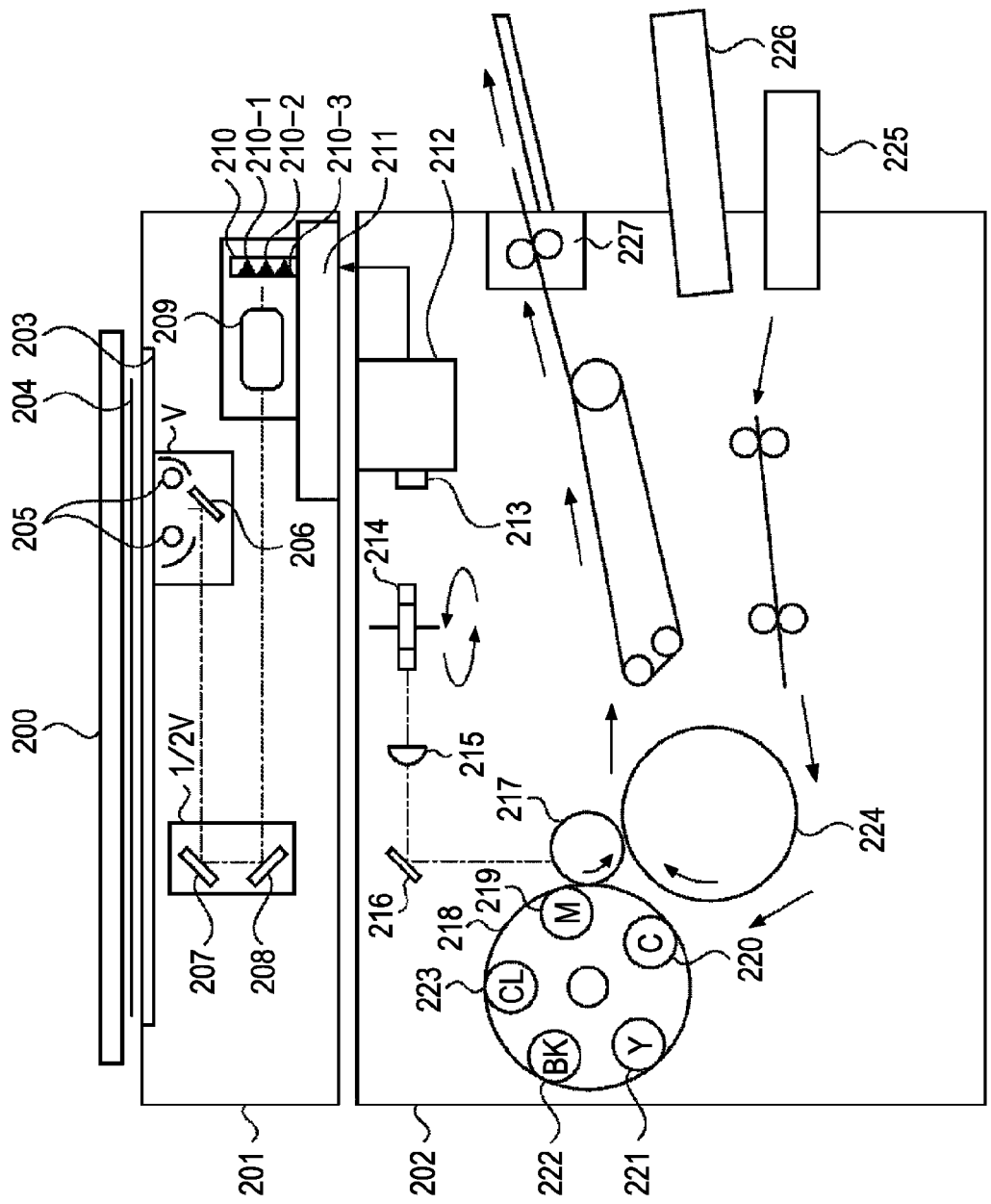
FIG. 2 shows an overview of an apparatus.

FIG. 2 shows an overview of an apparatus including the configuration shown in FIG. 1.

Referring to FIG. 2, an image scanner section 201 scans an original document and performs digital signal processing.

In addition, a printer section 202 prints, in full color, an image corresponding to the original image data scanned by the image scanner section 201.

The image scanner section 201 includes a mirror surface pressing plate 200. A document 204 placed on a glass document plate (hereinafter, referred to as a platen) 203 is irradiated by lamps 205.

The reflected light of this irradiated light is led to a lens 209 by mirrors 206, 207, and 208. An image is formed on three lines of solid-state image pickup elements (hereinafter, referred to as CCDs) 210 through the lens 209.

As a result, three image signals of red (R), green (G), and blue (B) are sent to a signal processing unit 211 as full-color information.

The lamps 205 and the mirror 206 and the mirrors 207 and 208 mechanically move in a direction orthogonal to electric scanning direction (main scanning direction) of a line sensor at speeds of V and ½V, respectively, whereby the whole surface of the document is scanned (sub scanning).

Here, the document 204 is scanned at a resolution of 600 dpi (dots/inch) in the main scanning and the sub scanning directions. The scanned image signals of one page of the document are stored in an internal data storage unit.

The scanned image signals fed to the signal processing unit 211 are stored in an image storage unit, for example a hard disk (not shown), along with transparent image information to be described later with reference to FIG. 5.

The signal processing unit 211 includes the image data input unit 101 to the image forming unit 112 shown in FIG. 1.

Accordingly, the scanned image signals stored in the image storage unit are input to the image data input unit 101. The image signals are electrically processed in units of pixels and divided into components of magenta (M), cyan (C), yellow (Y), and black (Bk) by the color converting unit 102.

Each divided image signal component is then sent to the image forming unit 112 through the tone correcting unit 103 and the halftone processing unit 104 as shown in FIG. 1 and then sent out to the printer section 202.

In addition, the signal processing unit 211 includes the transparent toner pattern specifying unit 105 to the mask processing unit 111 for generating transparent image data and the image forming unit 112 shown in FIG. 1.

Accordingly, the signal processing unit 211 generates an image signal (CL) for the transparent image data in units of pixels, and sends out the image signal to the printer section 202.

The details of this processing are as described with reference to FIG. 1.

The image signals of M, C, Y, Bk, and CL are sent to a laser driver 212. The laser driver 212 modulates and drives a semiconductor laser 213 according to the sent image signals.

A photoconductor drum 217 is scanned with the laser beam via a polygon mirror 214, an f-θ lens 215, and a mirror 216. As in the case of scanning, image data is written at a resolution of 600 dpi (dots/inch) in the main scanning and the sub scanning directions.

A rotating developing unit 218 includes a magenta developer 219, a cyan developer 220, a yellow developer 221, a black developer 222, and a clear (transparent) developer 223.

These five developers alternately come into contact with the photoconductor drum 217 and an electrostatic image formed on the photoconductor drum 217 is developed with a toner of each color.

A transfer drum 224 transfers the image developed on the photoconductor drum 217 onto a sheet, which is supplied from a sheet cassette 225 or 226 and is wound around this transfer drum 224.

In this manner, five colors of M, C, Y, Bk, and clear (transparent) are sequentially transferred. Thereafter, the sheet passes through a fixing unit 227 where the toners are fixed to the sheet. The sheet is then discharged.

FIG. 4 shows an example of an output image obtained with the above-described apparatus.

An output image 402 is obtained by scanning an original image 401 with an image scanner section, performing various kinds of image processing, and superimposing a transparent toner layer on a sheet. Regarding a transparent image that is an image formed using a transparent toner, "copy prohibited" and an operation date are selected and set in the above-described user interface.

Since a specified character string superimposed on the image 402 is actually printed with a transparent toner, the character string cannot be visually confirmed as an image.

However, by obliquely observing the output image under a light utilizing glossiness of the image, the character string formed with the transparent toner can be recognized.

[Transparent Image Information]

FIG. 5 shows a diagram illustrating a data structure of transparent image information, which is information regarding a transparent image. One bit is assigned to each of items 502 to 506.

Referring to FIG. 5, the item 501 shows a data structure necessary for adding a transparent image as a table.

The item 502 is an attribute indicating whether to perform transparent printing. If the transparent printing is performed, "1" is set. On the other hand, if the transparent printing is not performed, "0" is set.

When this attribute is set to "disabled", detailed information indicated by the items 503 to 513 are not needed.

The item 503 is an attribute indicating whether to perform whole surface transparent printing. If the whole surface transparent printing is performed, namely, if this attributed is set to "enabled", information indicated by the items 504 to 513 are not needed.

If a transparent image is added partially, "1" is set at the item 504. According to image area information, to be described later, corresponding to each pixel of an original image, a transparent image is added to each bit.

If a character string is printed with a transparent toner, "enabled" is set at the item 505. Here, the character string information includes content 506, a size 507, a font 508, and an angle 509 of the character string.

If an image to be added with a transparent toner is separately specified, "enabled" is set at the item 510.

Here, an ID 511 for specifying an image has to be set as the image information at the same time.

A path to a file of the image may also be used instead of the ID 511.

The item 512 represents that an image to be formed with a transparent toner is previously embedded in additional information, such as the image area information, of the original image data.

Here, the image area information is additional information different from information indicating whether each pixel of the original image is a "character pixel" or a "non-character string" and information indicating the luminance, the color density, and the color difference, such as whether each pixel is a "color pixel" or a "monochrome pixel".

FIG. 5 shows that the transparent image information is added at the 6th bit of the image area information.

The item 513 represents an original guarantee level.

The original guarantee level indicates permitted alternative printing methods used to obtain an alternative printed material by creating an alternative image of a transparent image instead of employing a method for obtaining a transparent-image-containing printed material using a transparent toner.

In an example shown in FIG. 5, the following five steps are settable.

0: Addition of a transparent image, fine dot (copy-forgery-inhibited pattern) printing, stamp printing, or combination-free printing is permitted.
1: Addition of a transparent image, fine dot (copy-forgery-inhibited pattern) printing, or stamp printing is permitted.
2: Addition of a transparent image or fine dot (copy-forgery-inhibited pattern) printing is permitted.
3: Printing other than addition of a transparent image is not permitted.
4: The level is automatically determined.

These levels are defined depending on a system.

A method for determining the original guarantee level will be described later in detail.

[Transparent Image Data Creation Method]

FIGS. 6A to 6C show diagrams illustrating methods for creating transparent image data from the transparent image information shown in FIG. 5. Input devices 601, 611, and 621 correspond to input devices of images and other information, such as the multifunction device 1602 shown in FIG. 16 and a document scanner, a remote computer, and a local user interface accompanying with a host computer (not shown).

Transparent image information 604, 614, and 624 correspond to the transparent image information shown in FIG. 5.

First, a document having a character-string-information-containing transparent image information will be described with reference to FIG. 6A.

An image registering user registers character string information in the user interface shown in FIG. 3, thereby automatically creating a combined image without creating another image to be combined.

FIG. 6A shows an example where image data 602 including a CMYK four-plane image and image area information is input from an input device 601.

Although the CMYK four-plane image is used as an example here, the creation method can be similarly applied to other data in RGB or the like or data of a binary image.

Original image data 603 is generated from the CMYK plane image and the image area information included in the image data 602.

When a character string is specified, transparent image data is generated in a storage area 606 from the transparent image information 604 by a font rasterization function 605.

A document in which image data is registered as a transparent image will now be described with reference to FIG. 6B.

An image registering user registers image data in the user interface shown in FIG. 3, thereby being able to create given transparent image data.

As in the case of FIG. 6A, original image data 613 is also generated in this case.

Unlike FIG. 6A, an image is specified in the transparent image information 614 as a transparent image. Transparent image data is generated in a storage area 615 with reference to an image indicated by an image ID.

A document registered by an external host computer with a transparent image being previously included in image data by an external controller (not shown) will now be described with reference too FIG. 6C. A document that includes a transparent image previously registered by an external controller (not shown) and that is registered by an external host computer will now be described with reference to FIG. 6C.

As in the case of FIG. 6A, original image data 623 is also generated in this case.

Unlike FIG. 6A, a binary image indicating whether to form transparent image data is embedded in the 6th bit of image area information 624. More specifically, the binary image is a binary bitmap. If "0" is set, recording is performed using a transparent toner. On the other hand, if "1" is set, the recording is not performed using the transparent toner.

Based on this information, transparent image data is generated in a storage area 625.

[Transparent Image Printing Method]

FIG. 7 shows a method for obtaining a printed material in which a transparent image is added to an original image using transparent image data.

Figure 8:
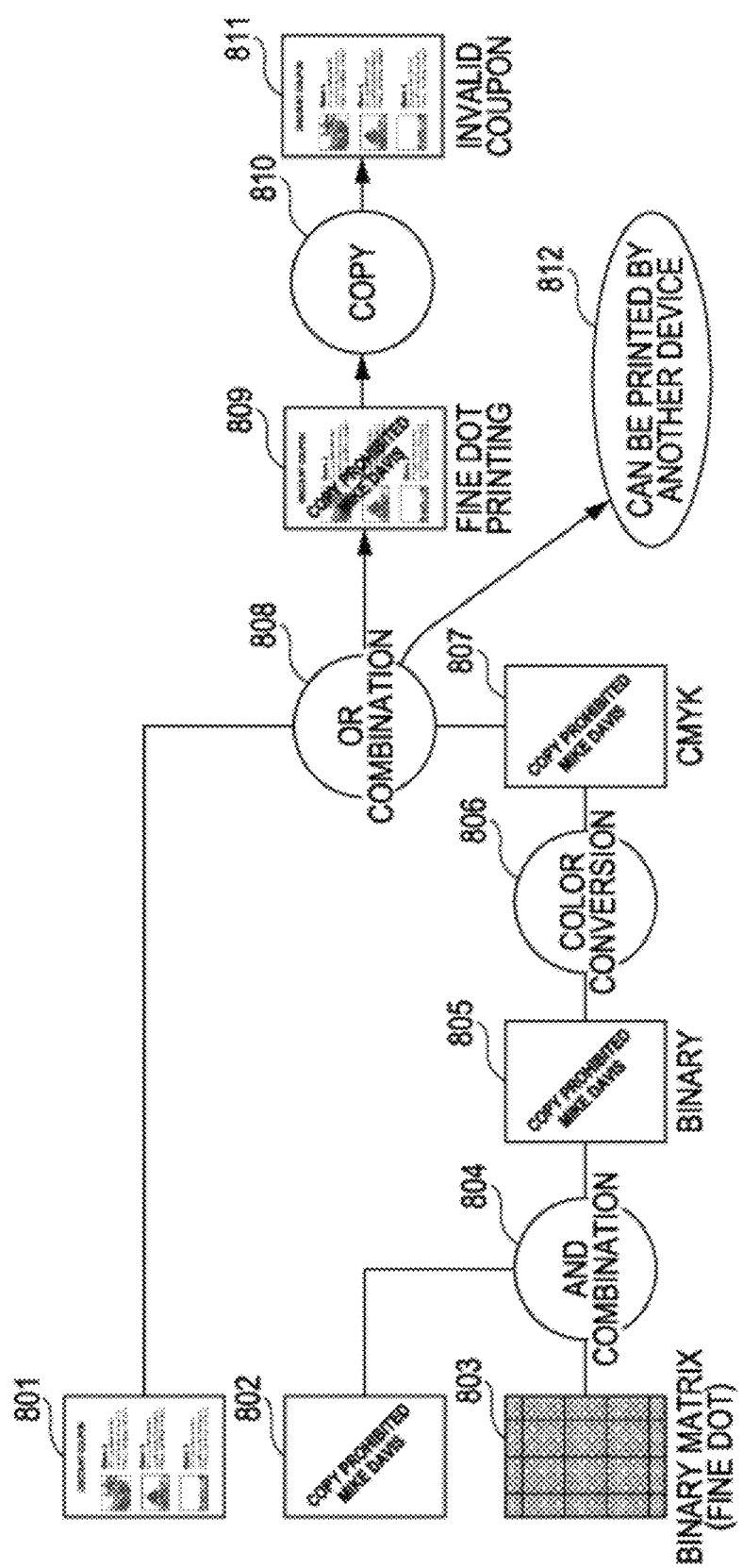
FIG. 8 shows a fine dot printing method for obtaining an alternative printed material by creating an alternative image of a transparent image from transparent image data.
Figure 9:
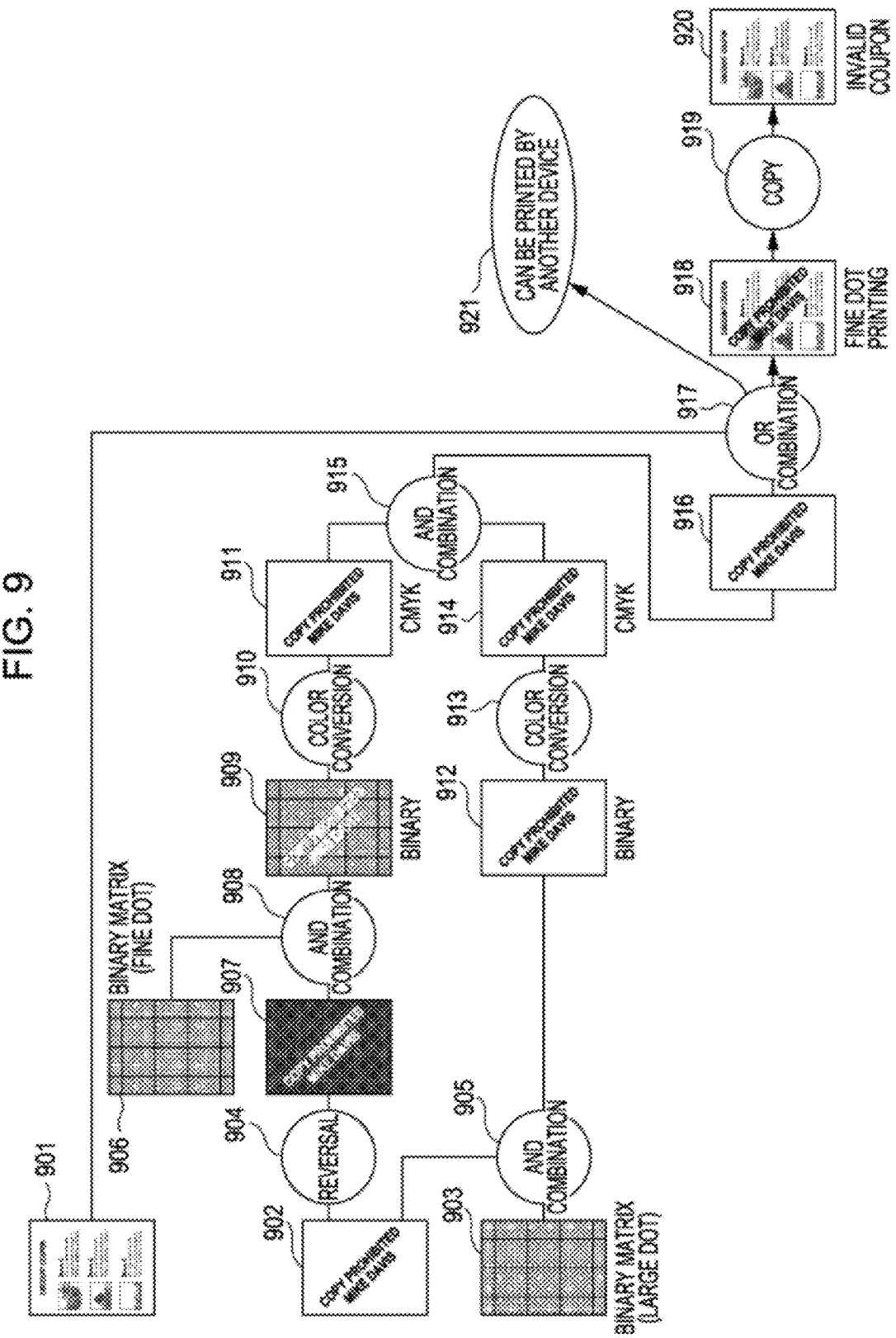
FIG. 9 shows a copy-forgery-inhibited-pattern printing method for obtaining an alternative printed material by creating an alternative image of a transparent image from transparent image data.
Figure 10:
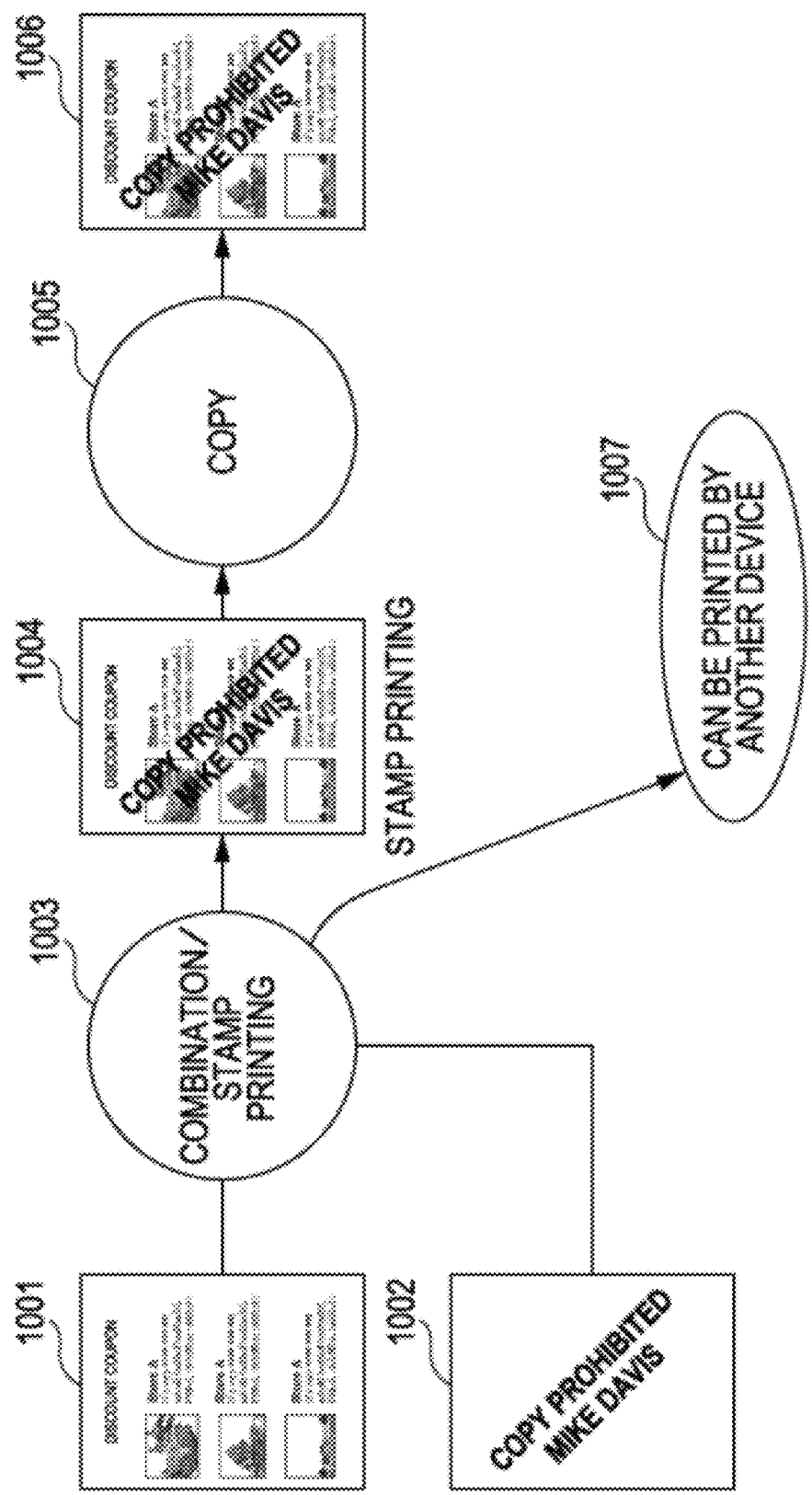
FIG. 10 shows a stamp printing method for obtaining an alternative printed material by creating an alternative image of a transparent image from transparent image data.

FIGS. 8 to 10 show a fine dot printing method, a copy-forgery-inhibited pattern printing method, and a stamp printing method for obtaining an alternative printed material by creating an alternative image of a transparent image from transparent image data, respectively.

FIG. 7 shows a method for adding a transparent image to an original image using transparent image data.

In response to a print instruction from an operation unit of the input devices 601, 611, and 621, the image forming unit 112 combines original image data 701 with transparent image data 702 and prints the combined image on a sheet using a transparent toner to output a transparent character-string containing document 704.

If a user having obtained the document created in this manner copies the document with a multifunction device or the like, the transparent character string shown in the document 704 cannot be scanned with a scanner unit of the multifunction device. Since a transparent character string shown in the document 704 is not copied in the copied material 706, the original guarantee is realized.

FIG. 8 shows a method for printing an alternative image of a transparent image by creating fine dot image data using the transparent image data.

Fine dots are not recognized as dots constituting significant information, but are recognized as a background when the dots are scanned with a scanner during a copy operation and have a size to be removed by background removal processing. Although the size varies depending on the specification of the scanner, the size may be approximately 84×10-3 mm.

Transparent image data 802 and a binary matrix (fine dots) 803 are combined using an AND combination function to generate fine dot image data 805.

The fine dot image data 805 is then converted into color fine dot image data 807 in color space conversion processing. Although the color processing is described in this exemplary embodiment, the color space conversion is not performed in monochrome processing and the fine dot image data 805 is used as it is.

Original image data 801 is then combined with the color fine dot image data 807 in combination processing. The combined image data is printed on a sheet to output a color fine-dot character-string containing document 809.

If a user having obtained a printed material created in this manner copies this printed material with a multifunction device or the like, the color fine dot character string shown in the document 809 is removed in the background removal processing and is not copied in a copied material 811. Accordingly, the original guarantee is realized.

Additionally, the combined data of the original image data 801 and the color fine dot image data 807 can be transferred to another image processing apparatus not having a transparent printing function and processed therein.

FIG. 9 shows a method for printing an alternative image of a transparent image by creating copy-forgery-inhibited pattern image data using transparent image data.

A copy-forgery-inhibited pattern printing function is a function for combining the above-described fine dots with large dots that are reproduced as dots after copying and for printing the combined result. If a user attempts to copy this printed material, the fine dots are removed in the above-described background removal processing and only a pattern drawn by the large dots remains on a sheet after copying.

Transparent image data 902 is combined with a binary matrix (large dots) 903 using an AND combination function to generate large dot image data 912.

The large dot image data 912 is then converted into color large dot image data 914 in color space conversion processing.

In addition, reversed image data 907 of the transparent image data 902 is generated using a reversal function. The reversed image data 907 is combined with a binary matrix (fine dots) 906 using the AND combination function to generate fine dot image data 909.

The fine dot image data 909 is then converted into color fine dot image data 911 in the color space conversion processing. Although color processing is described in this exemplary embodiment, the color space conversion is not performed in monochrome processing.

The color fine dot image data 911 is then combined with the color large dot image data 914 using a combination function to generate fine dot/large dot image data 916 in a storage area.

Original image data 901 is then combined with the fine dot/large dot image data 916 in combination processing and the combined image data is printed on a sheet to output a copy-forgery-inhibited-pattern-containing document 918.

If a user copies the printed material created in this manner with a multifunction device or the like, a background formed by color fine dots shown in the document 918 is not copied in a copied material 920 and only a large dot character string of a latent image portion is copied. Accordingly, the original guarantee is realized.

Since fine dots and large dots are drawn in a background portion in the copy-forgery-inhibited pattern printing, dots stand out more in an image than a transparent-image-containing image. Accordingly, it is difficult to maintain the high image quality of a transparent image.

Thus, since the fine dot printing serving as the alternative of the transparent printing can keep characteristics of transparent printing of the original guarantee and the high image quality, the copy-forgery-inhibited pattern printing is used when the fine dot printing is not available for some reason.

In addition, the combined data of the original image data 901 and the fine dot/large dot image data 916 can be transferred to another image processing apparatus not having a transparent printing function and processed therein.

FIG. 10 shows a method for performing alternative printing by creating a stamp image using transparent image data.

Original image data 1001 is combined with transparent image data 1002 and the combined image is printed on a sheet. An image 1004 supposed to be formed with a transparent toner is printed with an ordinal toner (toner having pigments) or ink.

This printing operation is called stamp printing. If this printed material is copied with a multifunction device or the like, a stamp character is copied in a copied material 1006. Accordingly, the stamp printing cannot be used for the purpose of the original guarantee.

Furthermore, the image quality higher than that of the transparent-image-containing image cannot be expected in the stamp printing. Accordingly, the stamp printing is not preferable as the alternative of the transparent image printing for the purpose of maintenance of the high image quality and the original guarantee.

The combined data of the original image data 1001 and the transparent image data 1002 can be transferred to another image processing apparatus not having a transparent printing function and processed therein.

Printing having an advantage similar to that of the stamp printing becomes available by lowering the saturation of an image at an area not subjected to addition of a transparent image to relatively increase the saturation of an image to be subjected to addition of the transparent image. This method may be employed instead of the stamp printing.

[Original Guarantee Level]

The original guarantee level shown in FIG. 5 will be described below according to an exemplary embodiment of the present invention.

Referring to FIG. 5, the item 513 represents the original guarantee level.

In an example shown in FIG. 5, the following five steps are settable.

0: Addition of a transparent image, fine dot (copy-forgery-inhibited pattern) printing, stamp printing, or combination-free printing is permitted.

1: Addition of a transparent image, fine dot (copy-forgery-inhibited pattern) printing, or stamp printing is permitted.

2: Addition of a transparent image or fine dot (copy-forgery-inhibited pattern) printing is permitted.

3: Printing other than addition of a transparent image is not permitted.

4: The level is automatically determined.

When an image registering user registers transparent image data, information regarding the original guarantee level is added to data attached with a print attribute to be stored in a document storage system or print data created in response to a print instruction. This original guarantee level is set in a manner described below.

The original guarantee level 3 is set when printing without using a transparent toner is not desired when printing of transparent image data is instructed.

For example, when a user wants to print an original-guarantee requiring material, such as, for example, materials to be distributed to a customer, at a high image quality, this level is selected and transparent printing is performed during a printing operation. If the transparent printing is not available, the print job is suspended or cancelled.

The original guarantee level 2 is set when a transparent image does not have to be printed using a transparent toner when printing of transparent image data is instructed but printing of an image whose information does not remain after copying of the printed material is desired.

For example, when a user wants to add a mark or an image to a discount coupon or the like to realize the original guarantee, the original guarantee is mandatory but the mark or the image does not have to be printed transparently. In such a case, this level is selected.

In this manner, transparent printing or fine dot printing is selected at the time of printing of the document. If these printing methods are not available, the print job is suspended or cancelled.

Meanwhile, a copy-forgery-inhibited pattern can be created with a technique similar to that of creating fine dots and copy-forgery-inhibited pattern printing can also realize the original guarantee. However, as described before, since dots are printed in a background portion in the copy-forgery-inhibited pattern printing, the dots stand out more in the image than the transparent printing and the fine dot printing. Accordingly, it is difficult to maintain the high image quality.

Since the fine dot printing can achieve the purposes of the original guarantee and maintenance of the high image quality more properly than the copy-forgery-inhibited pattern printing as the alternative of the transparent printing, the fine dot printing should be preferentially selected than the copy-forgery-inhibited pattern printing. However, when the fine dot printing is not available for some reason, such as due to functions of a device, the copy-forgery-inhibited pattern may be selected.

Additionally, when characters and drawings, which are less outstanding in an original document, are printed using the copy-forgery-inhibited pattern printing method, the characters and drawing stand out after copying of the printed material. Thus, the copy-forgery-inhibited pattern printing has a higher copy prevention effect than the transparent printing or the fine dot printing.

Accordingly, when a user wants to increase the copy prevention effect, the copy-forgery-inhibited pattern printing may be selected.

In this manner, the transparent printing, the fine dot printing, or the copy-forgery-inhibited pattern printing is selected at the time of printing of the document. If these printing methods are not available, the print job is suspended or cancelled.

The original guarantee level 1 is set when the original guarantee is not required or when the transparent image printing and the fine dot printing are not available for some reason, such as due to functions of a printer, but a user wants to print by using a printing method other than the transparent image or the fine dot printing.

In this manner, the transparent printing, the fine dot printing, the copy-forgery-inhibited pattern printing, or the stamp printing is selected at the time of printing of the document. If these printing methods are not available, the print job is suspended or cancelled.

The original guarantee level 0 is set when transparent image data does not have to be left.

In this case, only original image data is printed, and the transparent image data is not printed.

The original guarantee level 4 for automatically determining combination information is set when an image registering user does not want to perform a troublesome setting.

[Processing Flow]

Figure 11:
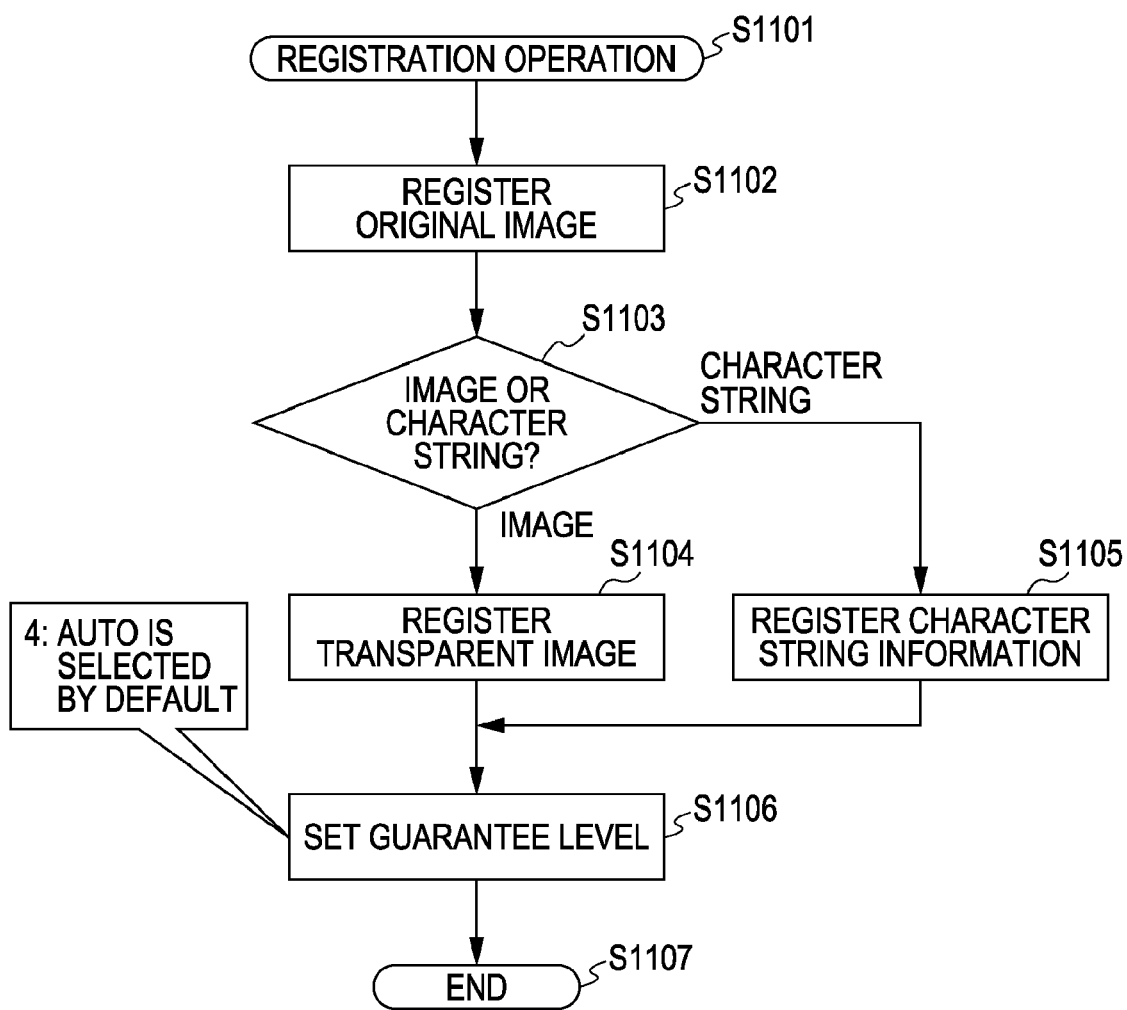
FIG. 11 is a flowchart illustrating registration of transparent image information shown in FIGS. 5 to 6C.

FIG. 11 shows a flowchart illustrating registration of transparent image information shown in FIGS. 5 to 6C. At STEP S1101, the registration operation starts.

At STEP S1102, an image registering user first registers original image data when registering a transparent image. As described in FIGS. 6A to 6C, the registration is performed by scanning a document with an input device or inputting image data via a network or the like.

At STEP S1103, the user registers transparent image information in a user interface screen shown in FIG. 3. The user determines whether to use a character string or an image in the screen.

If the user registers the character string data, the process proceeds to STEP S1105. If the user specifies an image, the process proceeds to STEP S1104. At STEP S1106, the user sets a guarantee level of the transparent image information specified at the above-described step. At STEP S1107, the registration operation ends.

Here, the transparent image data may be previously registered or may be registered during the operation, although it is not shown in FIG. 11. In addition, although the character string information and the image are exclusively registered in the above-described operation, there is an exemplary embodiment where the image and the character string are transparently printed at the same time.

Exemplary Embodiment 1

Figure 17:
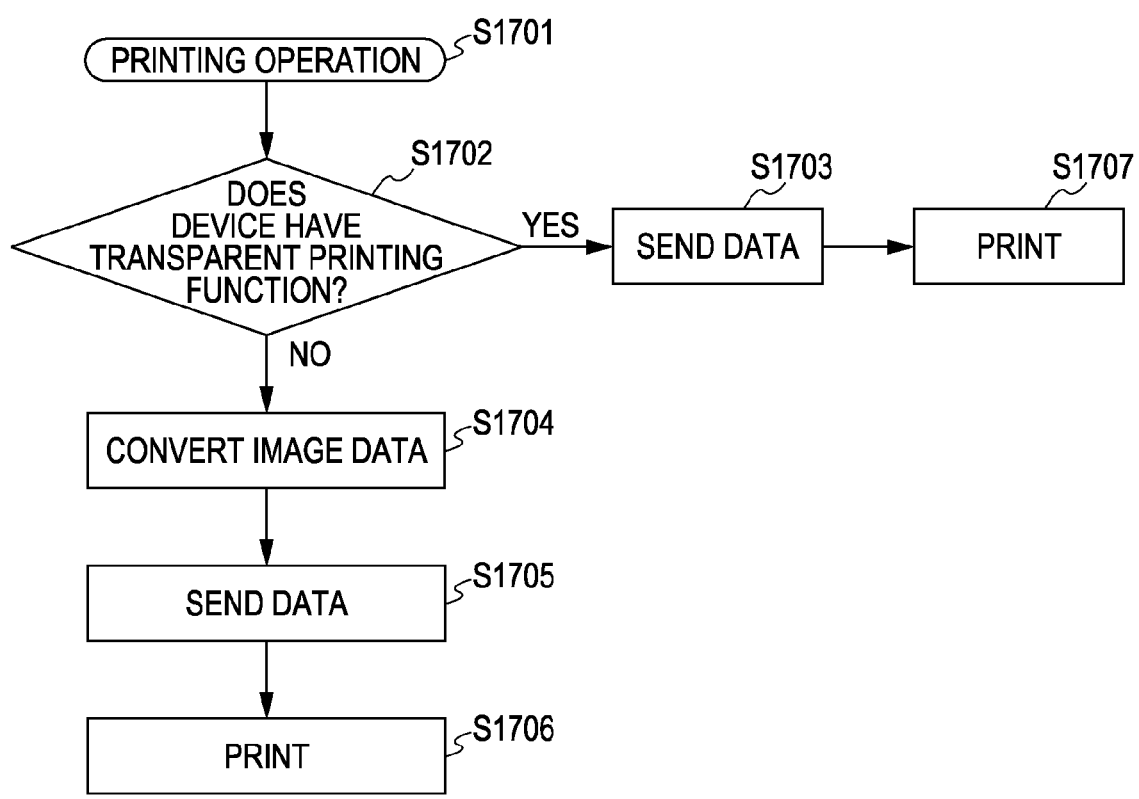
FIG. 17 is a flowchart of a printing operation according to an exemplary embodiment of the present invention.

FIG. 17 is a flowchart showing an operation for printing an image at a transmission destination after print data of an image attached with transparent image information is sent from the multifunction device 1602 or the external controller 1601 shown in FIG. 16 to the multifunction devices 1606 to 1608.

As shown in FIG. 11, the image registering user 1603 registers image data in the multifunction device 1602 or the external controller 1601.

If a print job or a copy job is entered by the image registering user at STEP S1701, an identifying unit included in the multifunction device 1602 on a data transmission side identifies a printing capability of the multifunction devices 1606, 1607, and 1608 connected thereto via the network 1605 at STEP S1702.

If the identification result indicates that "the transparent printing function is available" as in the multifunction device 1608, the process proceeds to STEP S1703. At STEP S1703, the multifunction device 1602 sends the transparent image data to the multifunction devices.

However, if the identification result indicates that "the transparent printing function is not available", as in the multifunction devices 1606 and 1607, the process proceeds to STEP S1704. In this case, the multifunction device on the transmission side converts the image data into image data that can be printed by the transmission destination apparatus with a recording material at STEP S1704 and sends the converted image data to the multifunction devices at STEP S1705. Upon receiving the image data, the multifunction device on the reception side prints the image data at STEP S1706.

The image data that can be printed by the transmission destination apparatus with the recording material is data that can be printed by the transmission destination apparatus with the recording material while maintaining information included in the transparent image data. This image data for the recording material may be, for example, image data created in the fine dot printing, the copy-forgery-inhibited pattern printing, and the stamp printing.

Figure 18:
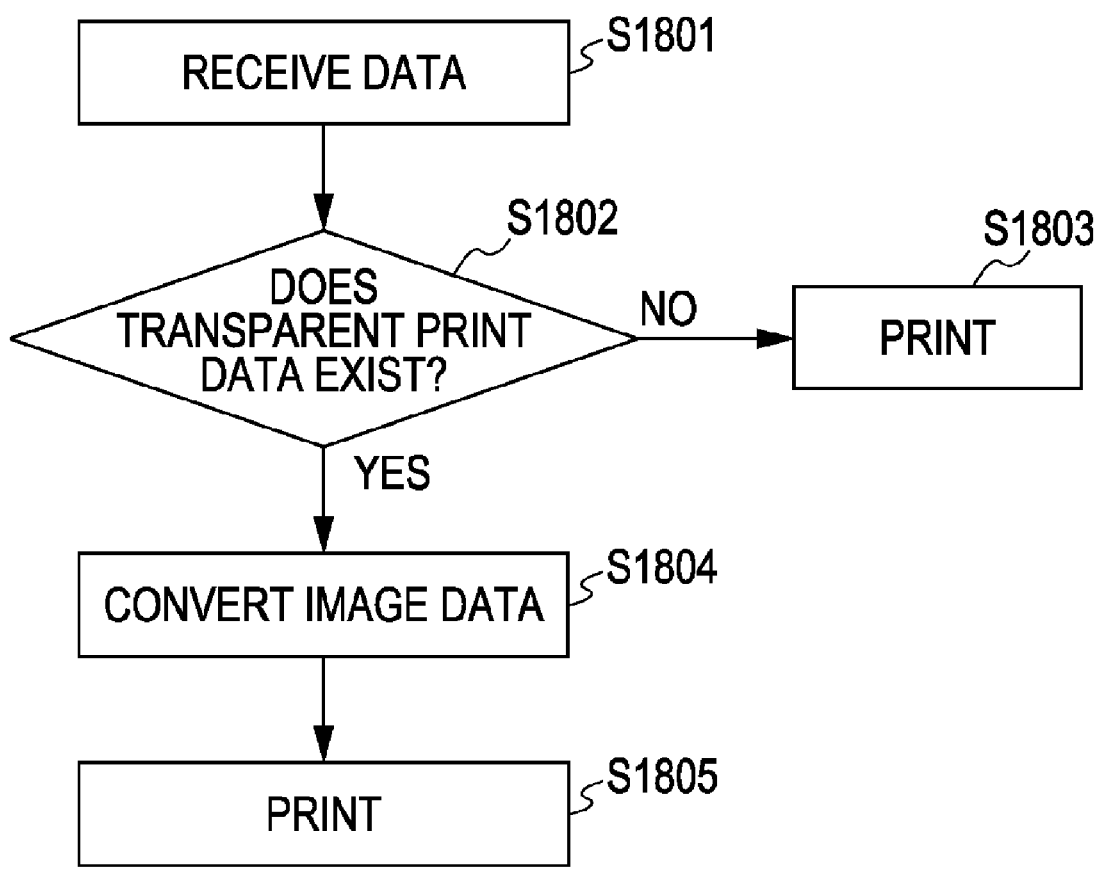
FIG. 18 is a flowchart of a printing operation according to an exemplary embodiment of the present invention.

FIG. 18 shows a flowchart of an operation for printing an image after a reception-side apparatus having received print data converts the transparent-image-data-containing print data into another image data when the print data of the image to be printed with a transparent toner is sent to an apparatus not having a transparent printing function.

As shown in FIG. 11, the image registering user 1603 registers image data in the multifunction device 1602.

The multifunction devices 1606 and 1607 on the data reception side receive the image data at STEP S1801. An identifying unit of the multifunction devices 1606 and 1607 having received the data identifies whether the received data includes transparent print data. If the identification result indicates that "transparent print data is not included", the process proceeds to STEP S1803. At STEP S1803, the multifunction devices 1606 and 1607 print the received image data without performing any processing.

If the identification result indicates that "transparent print data is included", the process proceeds to STEP S1804. The multifunction devices 1606 and 1607 convert the transparent image data into another printable image data at STEP S1804 and print the converted image data at STEP S1805.

The image data printable by the reception-side printer is image data that can be printed by the printer with a recording material while maintaining information included in the transparent image data. This image data for the recording material may be, for example, image data created in the fine dot printing, the copy-forgery-inhibited pattern printing, and the stamp printing.

According to the exemplary embodiment 1, if an image processing apparatus of the transmission destination of print data is capable of performing transparent printing, the apparatus prints the print data as it is. On the other hand, if the image processing apparatus of the transmission destination of the print data is incapable of performing transparent printing, the image data is processed using an alternative method.

Exemplary Embodiment 2

In this exemplary embodiment of the present invention, a description is given for a case where an image registering user enters a print job or a copy job and the job is carried out in an apparatus connected via a network. At this time, an original guarantee level is also considered.

Figure 12:
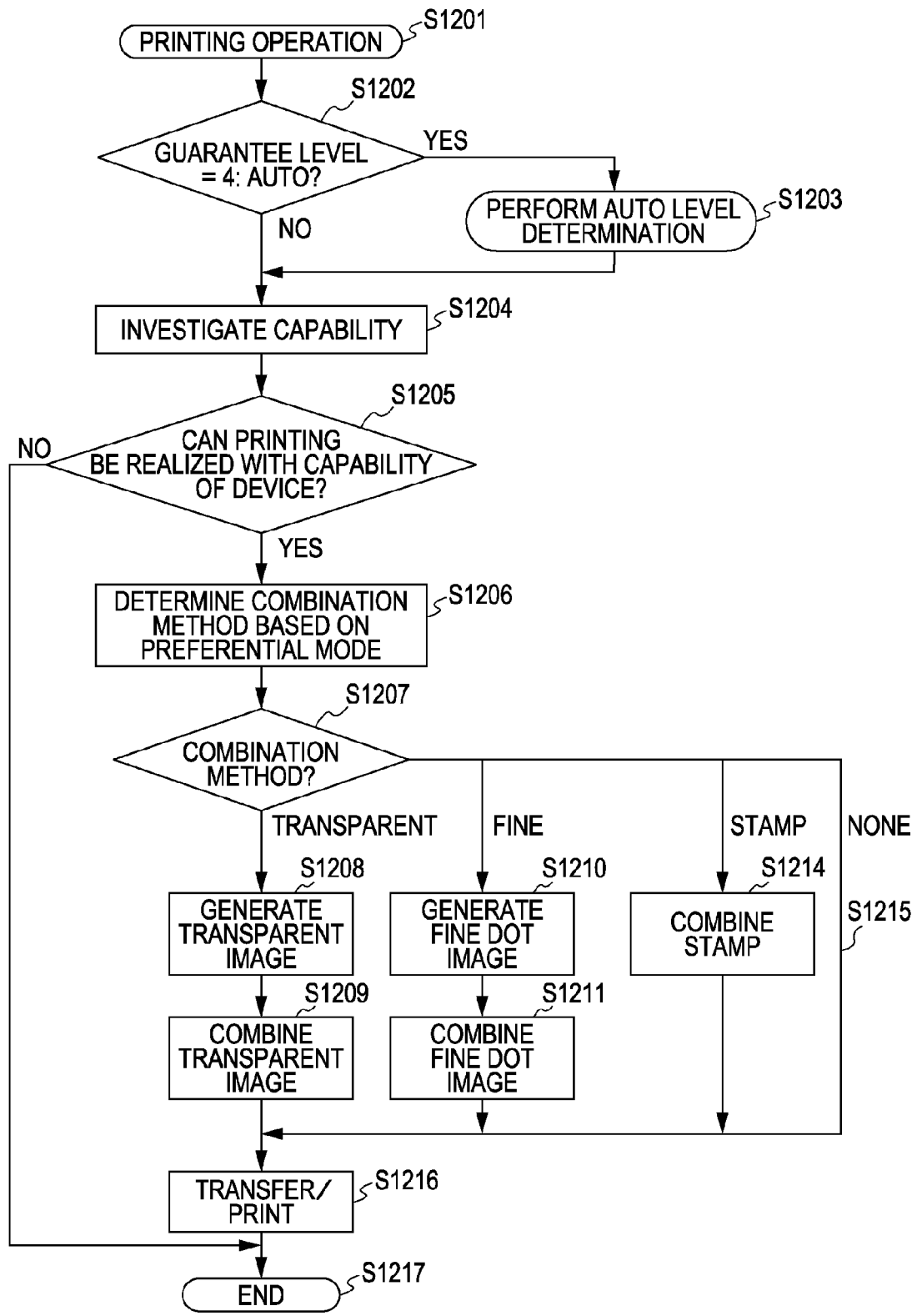
FIG. 12 is a flowchart illustrating a printing operation.

FIG. 12 shows flowchart illustrating a printing operation. At STEP S1201, the printing operation starts.

Upon the image registering user 1603 entering a print job or a copy job in an image processing system according to an exemplary embodiment of the present invention, an identifying unit included in the multifunction device 1602 determines whether the original guarantee level of a document, printing of which is started at STEP S1202, is set to the level 4.

If the original guarantee level is set to the level 4, the process proceeds to STEP S1203 of automatic level determination. The details of the automatic level determination will be described after the description of the exemplary embodiment 2.

If the identifying unit determines that the original guarantee level is one of the levels 0 to 4, a transmission-side apparatus (multifunction device 1602) investigates a printing function of printers 1606 to 1608 of an image data transmission destination at STEP S1204.

If the identifying unit determines that the printing according to a combination method specified by the guarantee level is not available by comparing the guarantee level with the printing function of the image-data transmission-destination printer at STEP S1205, the printing operation is aborted at STEP S1217.

For example, if the guarantee level is set to the level 3 of "not permitting printing other than addition of a transparent image" but the printer does not have a transparent printing function, the printing operation is aborted.

Even if it is determined that the printing is available at STEP S1205, unavailable printing functions among the combination methods specified by the original guarantee level are excluded from candidates. For example, if the original guarantee level is the level 1 that permits addition of a transparent image, fine dot (copy-forgery-inhibited pattern) printing, and stamp printing but the transmission destination apparatus is determined not to have the transparent printing function, the transparent printing is excluded from candidates of the printing methods and only the fine dot printing, copy-forgery-inhibited pattern printing, and stamp printing are treated as the candidates of the printing method.

The transmission-side multifunction device 1602 creates data including printing method options and sends this data to the transmission destination apparatuses 1606 to 1608 along with image data.

Upon receiving this data, the reception-side apparatus selects a preferential-mode-based combination method from the candidates of the combination method with reference to the preferential mode for selection of the combination method at STEP S1206.

This preferential mode is set previously by an administrator of the reception-side apparatus. The kinds of the preferential mode include an image quality preferential mode, a cost preferential mode, and a copy prevention effect preferential mode.

For example, if the preferential mode is set to the image quality preferential mode, a printer having a transparent printing function performs transparent image printing, for which a high image quality is expected, regardless of the original guarantee level.

Printing of a transparent image includes a transparent image forming step in addition to ordinal CMYK four-color image forming steps. Accordingly, the printing of the transparent image may cost more than forming an ordinal CMYK four-color image.

Accordingly, when the cost preferential mode is set, another combination method is selected for a document having the original guarantee level that permits printing other than addition of the transparent image. For example, in an apparatus capable of performing the transparent printing and the fine dot printing, the fine dot printing is selected instead of the transparent printing.

If the copy prevention effect preferential mode is selected and the copy-forgery-inhibited pattern printing is included in the options, the copy-forgery-inhibited pattern printing is selected.

At STEP S1207, the process is divided into an operation for the respective combination method according to the selected combination method.

STEPs S1208 and S1209 correspond to combination of a transparent image shown in FIG. 7. STEPs S1210 and S1211 correspond to combination of fine dots shown in FIG. 8. STEP S1214 corresponds to combination of a stamp image shown in FIG. 10. At S1215, the combination is not performed.

After finishing the combination, the image data is transferred and printed at STEP S1216.

Alternatively, the image conversion may be performed at a transmission destination of the image. In this case, the transmission side apparatus selects the combination method and performs the combination instead of transmitting the image data and the data including the printing method options to the transmission destination apparatus before STEP S1206. After finishing the combination, the combined image data is transmitted to one of the transmission destination apparatuses 1606 to 1608.

Upon receiving the combined image data, the printers or the multifunction devices 1606 to 1608 print the image data with a printing unit at STEP S1216.

The order of various kinds of determination described in the flowchart is not limited to the order employed in this exemplary embodiment. For example, the investigation of the capability performed at STEP S1204 may be performed before determination of the guarantee level performed at STEP S1202.

In addition, the operations according to the combination methods vary depending on a system. It is expected that methods not described herein may be incorporated.

According to the above-described exemplary embodiment, an alternative printing method of the transparent printing can be determined based on the original guarantee level of the image data.

Exemplary Embodiment 3

A case where an original guarantee level is set to a level 4 of automatic determination will be described.

If an image registering user does not want to perform a troublesome setting, the user sets the original guarantee level to the level 4 of automatic determination.

In this exemplary embodiment, the original guarantee level is automatically determined using the data content, such as recognition of a character string and an image included in transparent image data, as a determination criterion.

Figure 13:
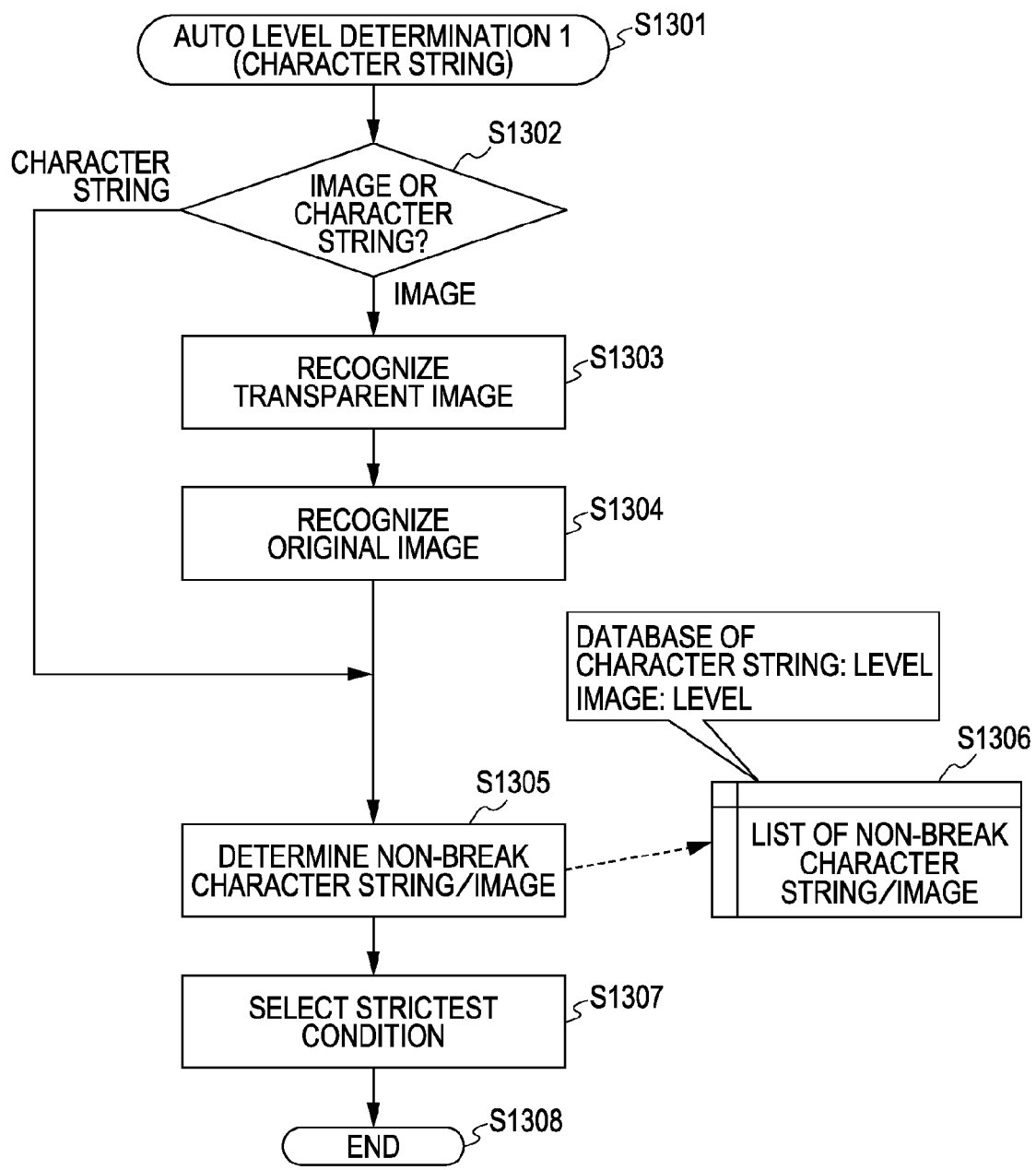
FIG. 13 is a flowchart illustrating automatic determination of an original guarantee level based on character-string/image recognition.

FIG. 13 shows a flowchart illustrating automatic determination of the original guarantee level based on recognition of a character string and an image. The operation starts at STEP S1301.

At STEP S1302, whether the transparent image data specifies a character string or an image is determined. If the transparent image data specifies an image, a characteristic of an image is extracted by recognition processing, such as image recognition, from the selected transparent image data at STEP S1303. If the character string is specified, the character string registered in the transparent image data is extracted. The process then proceeds to STEP S1305.

At STEP S1304, a characteristic of a character string or an image is extracted by recognition processing, such as image recognition, from the original image data.

At STEP S1305, the original guarantee level is automatically determined based on the characteristic of the character string or the image.

The original guarantee level is determined by making an inquiry at a database in which the characteristic of the character string or the image and a map of the original guarantee level are registered at STEP S1306.

Various exemplary embodiments are available regarding this database. For example, an administrator of a device may register data in this database from a remote computer and a local user interface. The database may be constructed in a server.

The registered data includes non-break characters, personal information such as, for example, a name of a creator of the document and an ID of the creator, and character strings such as "copy prohibited" and "confidential". Among such characters, the personal information, the character strings of "copy prohibited" and "confidential", and other characters are registered as the level 3, the level 2, and the level 1 or 0, respectively. In this manner, the original guarantee level is set depending on the registered characters.

Since the original guarantee level is set for each character string, one piece of transparent image data may have a plurality of original guarantee levels.

At STEP S1307, the strictest condition level (the strictest condition indicates a level with a larger number among 0 to 3) is extracted from the determined original guarantee levels.

After the original guarantee level is determined according to the above-described method, the process proceeds to STEP S1204 shown in FIG. 12 described in the exemplary embodiment 2 and combination and printing of the image is performed.

Exemplary Embodiment 4

As in the case of the exemplary embodiment 3, a method for automatically determining an original guarantee level will be described. However, in this exemplary embodiment, the original guarantee level is automatically determined based on a color density of an image of original image data to be combined with transparent image data.

Figure 14:
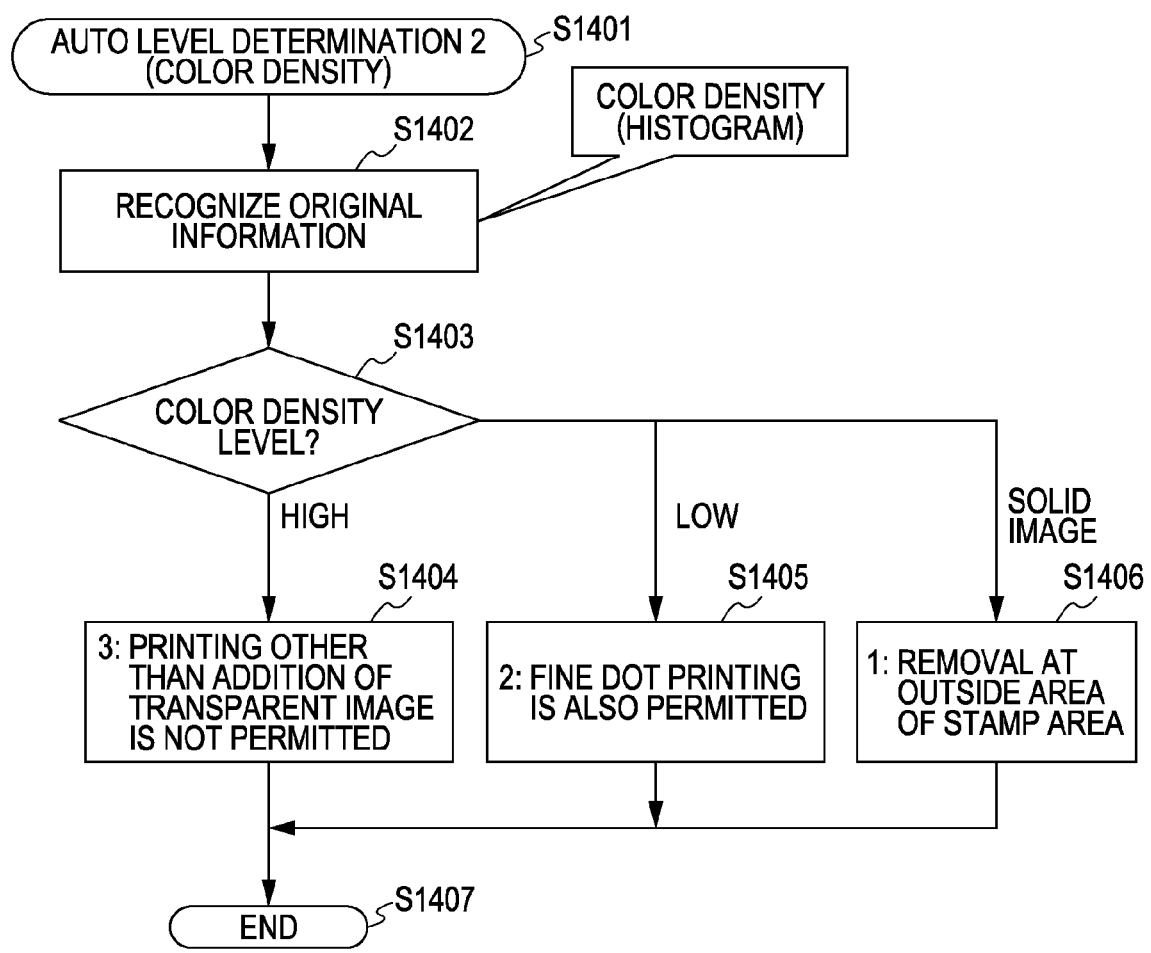
FIG. 14 is a flowchart illustrating automatic determination of an original guarantee level based on a color density of an image.

Depending on the color density of the original data, transparent printing may be suitable or may not be suitable. FIG. 14 shows a flowchart illustrating automatic determination of the original guarantee level based on the color density of the image. The operation starts at STEP S1401.

At STEP S1402, the color density of the original image is determined based on a histogram of the original image data at STEP S1402.

The color density level, such as "solid image", "high", and "low", is determined based on the determined color density and a predetermined threshold at STEP S1403. Each threshold is set freely by an administrator of a device or the like.

Since embedding of fine dots is more likely to cause image quality degradation when the color density level is "high", the process proceeds to STEP S1404 and the original guarantee level 3 for not permitting printing other than addition of a transparent image is selected.

Since embedding of fine dots is less likely to cause image quality degradation when the color density level is "low", the process proceeds to STEP S1405 and the original guarantee level 2 for also permitting fine dot printing is selected.

If the color density level is determined to be a "solid image" having a higher color density than the level "high", the process proceeds to STEP S1406. Since a transparent image does not stand out even if the transparent image is superimposed and fine dots are highly likely to be unseen, only a combination method for overwriting a character string, such as a stamp printing method, is selected. More specifically, only the stamp printing or the combination-free printing of the level 1 is permitted.

The above-described determination method is only an example, color-density-level classifying methods different from the above-described one and other determination methods based on the color density level are obviously available.

After the original guarantee level is determined according to the above-described method, the process proceeds to STEP S1204 shown in FIG. 12 described in the exemplary embodiment 2 and combination and printing of the image is performed.

However, if the color density level is determined to be a solid image, the apparatus has to be controlled to select the stamp printing or the combination-free printing even if other printing methods are selectable at STEP S1206 after STEP S1204.

Exemplary Embodiment 5

In this exemplary embodiment, an original guarantee level is determined using two methods, namely, the method for determining the original guarantee level based on character string/image recognition described in the exemplary embodiment 3, and the method for determining the original guarantee level based on the color density of the image described in the exemplary embodiment 4.

Figure 15:
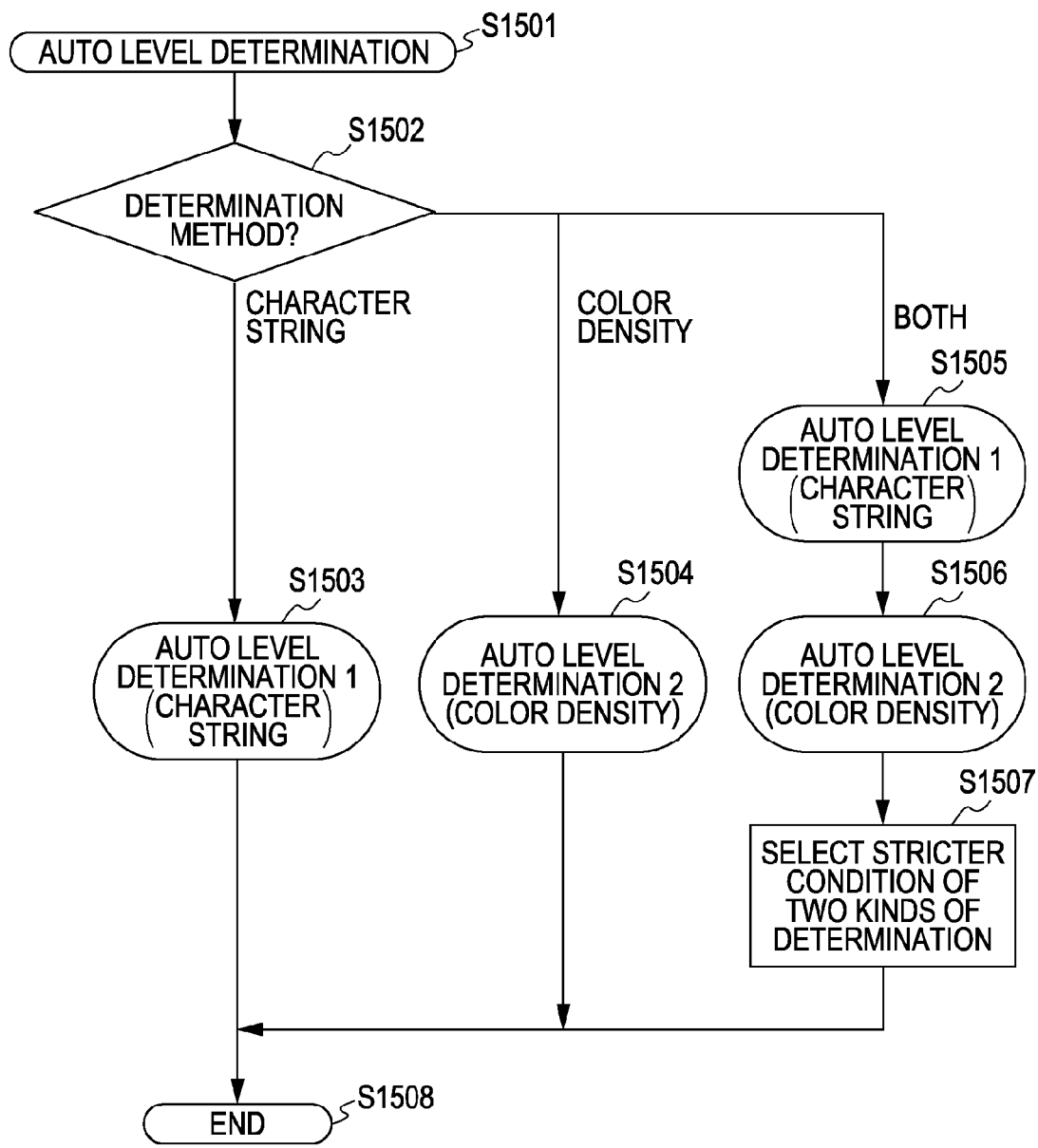
FIG. 15 is a flowchart illustrating automatic determination of an original guarantee level based on character-string/image recognition and image color density determination.

FIG. 15 shows a flowchart illustrating automatic determination of the original guarantee level based on the character string/image recognition and the color density determination.

At STEP S1501, the determination operation starts.

Whether to perform level determination based on the character string/image recognition shown in FIG. 13, level determination based on the determination of image color density shown in FIG. 14, or level determination based on the both is set according to a setting performed with an operation unit of the multifunction device 1602.

At STEP S1502, the determination method is read out. If the determination method indicates the determination based on the character string/image recognition, the process proceeds to STEP S1503. If the determination method indicates the determination based on the image color density, the process proceeds to STEP S1504. If both criteria are used, the process proceeds to STEP S1505.

When both criteria are used (STEP S1505), a result obtained from the determination of the character string/image performed at STEP S1505 is compared with a result obtained from the determination of the image color density performed at STEP S1506.

At STEP S1507, the stricter condition level (the stricter condition indicates a level with a larger number among 0 to 3) is extracted from the determined original guarantee levels. At STEP S1508, the determination operation ends.

An example of the level determination method is described herein, other methods for determining the level based on other information, such as a color mode of a document, a resolution, an amount of vector data, saturation, luminance, and an attribute of a character or a graphic, can be employed.

After the original guarantee level is determined according to the above-described method, the process proceeds to STEP S1204 shown in FIG. 12 described in the exemplary embodiment 2 and combination and printing of the image is performed.

Other Exemplary Embodiments of Present Invention

A processing method executed by a computer by reading out, as a code, a program, stored on a storage medium, for allowing configurations of the above-described exemplary embodiments to operate so that functions of the above-described exemplary embodiments are realized is also included in the scope of the present invention. In addition, a storage medium storing the above-described program and the program itself are included in the present invention.

A floppy disk, a hard disk, an optical disk such as a CD-ROM, a magneto-optical disk, a magnetic tape, a non-volatile memory card, and a read-only memory (ROM) can be used as such a storage medium.

Not only a program stored on the storage medium that alone causes the processing to be executed, but also a program operating on an operating system in cooperation with other software, and a function of an expansion board that executes operations of the above-described exemplary embodiments, are also included in the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-265576 filed Oct. 11, 2007, which is hereby incorporated by reference herein in its entirety.

What is claimed is:

1. An information processing apparatus comprising:
an identifying unit configured to identify, as an identification result, a printing capability of an apparatus that is a transmission destination of first image data instructed to be printed with a transparent recording material;
a determining unit configured to determine whether the apparatus as the transmission destination is able to print the first image data with the transparent recording material instructed to be printed with the transparent recording material based on the identification result of the identifying unit; and
a converting unit configured to convert, in response to the determining unit determining the apparatus as the transmission destination is not able to print the first image data with the transparent recording material, the first image data into second image data that can be printed by the apparatus as the transmission destination and is formed by placing dots having a predetermined size removable at a time of copying based on information attached to the first image data, wherein, in response to the determining unit determining that the apparatus as the transmission destination is able to print the first image data with the transparent recording material, the first image data is not converted.

2. The apparatus according to claim 1, wherein the information attached to the first image data is information regarding an original guarantee level indicating a security level of the first image data.

3. The apparatus according to claim 2, wherein, in response to the conversion indicated by the original guarantee level not being available with the printing capability identified by the identifying unit, a printing operation is aborted.

4. The apparatus according to claim 1, wherein the information attached to the first image data is information regarding at least one of: a character string included in the image data, and a color density of an image of the image data.

5. An information processing method comprising:
   identifying, as an identification result, a printing capability of an apparatus that is a transmission destination of first image data instructed to be printed with a transparent recording material;
   determining whether the apparatus as the transmission destination is able to print the first image data with the transparent recording material instructed to be printed with the transparent recording material based on the identification result; and
   converting the first image data into second image data that can be printed by the apparatus as the transmission destination and is formed by placing dots having a predetermined size removable at a time of copying based on information attached to the first image data, in response to determining the apparatus as the transmission destination is not able to print the first image data, wherein, in response to determining that the apparatus as the transmission destination is able to print the first image data, the first image data is not converted.

6. The method according to claim 5, wherein the information attached to the first image data is information regarding an original guarantee level indicating a security level of the first image data.

7. The method according to claim 6, wherein, in response to the conversion indicated by the original guarantee level not being available with the identified printing capability, a printing operation is aborted.

8. The method according to claim 5, wherein the information attached to the first image data is information regarding at least one of: a character string included in the image data, and a color density of an image of the image data.

9. A non-transitory computer-readable storage medium storing a computer program that causes a computer to execute the information processing method according to claim 5.

* * * * *